United States Patent
Ji et al.

(10) Patent No.: US 10,070,404 B2
(45) Date of Patent: Sep. 4, 2018

(54) SYNCHRONIZATION SIGNAL SENDING METHOD, SYNCHRONIZATION SIGNAL RECEIVING METHOD, AND RELATED APPARATUSES

(71) Applicant: Huawei Technologies Co., Ltd., Shenzhen, Guangdong (CN)

(72) Inventors: Tong Ji, Beijing (CN); Yiling Wu, Beijing (CN); Weiliang Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 80 days.

(21) Appl. No.: 15/436,510

(22) Filed: Feb. 17, 2017

(65) Prior Publication Data

US 2017/0164308 A1 Jun. 8, 2017

Related U.S. Application Data

(63) Continuation of application No. PCT/CN2014/084721, filed on Aug. 19, 2014.

(51) Int. Cl.
*H04W 56/00* (2009.01)
*H04W 48/16* (2009.01)
(Continued)

(52) U.S. Cl.
CPC ....... *H04W 56/001* (2013.01); *H04J 11/0069* (2013.01); *H04J 13/0055* (2013.01);
(Continued)

(58) Field of Classification Search
CPC .......................... H04W 56/001; H04W 48/16
See application file for complete search history.

(56) References Cited

U.S. PATENT DOCUMENTS 9,444,650 B2   9/2016  Muharemovic et al.
2011/0098070 A1*  4/2011  Han ..................... H04J 11/0079
                                                      455/507

FOREIGN PATENT DOCUMENTS

CN    101479951 A    7/2009
CN    102857457 A    1/2013
(Continued)

OTHER PUBLICATIONS

Acharya, Joydeep, et al. "Chapter 4: Physical Layer Signal Processing in LTE of Heterogeneous Networks in LTE-Advanced," Mar. 14, 2014, Wiley and Sons, XP055355432, 5 pages.
(Continued)

*Primary Examiner* — Siming Liu

(57) ABSTRACT

Embodiments of the present disclosure disclose a synchronization signal sending method, including: determining, by a transmit end device, a first signal, where the transmit end device operates in a serving cell, the first signal includes a first synchronization sequence, the first synchronization sequence is a sequence obtained after a special ZC sequence is cyclically shifted by a first quantity of digits and then dot multiplication or conjugate multiplication is performed on the cyclically shifted special ZC sequence and a characteristic sequence, the special ZC sequence is a ZC sequence with a root index being +1 or −1, and the characteristic sequence and/or the first quantity of digits are/is corresponding to a cell identity of the serving cell. In the synchronization signal sending method provided in the embodiments of the present disclosure, signal synchronization can be implemented in an M2M technology by using the ZC sequence.

10 Claims, 11 Drawing Sheets

(51) Int. Cl.
*H04J 11/00* (2006.01)
*H04J 13/00* (2011.01)
*H04L 5/00* (2006.01)
*H04L 27/26* (2006.01)

(52) U.S. Cl.
CPC ........ *H04L 5/0053* (2013.01); *H04L 27/2613* (2013.01); *H04L 27/2692* (2013.01); *H04W 48/16* (2013.01)

(56) References Cited

FOREIGN PATENT DOCUMENTS

| CN | 103178913 A | 6/2013 |
|----|-------------|--------|
| WO | 2008075881 A2 | 6/2008 |

OTHER PUBLICATIONS

Gul et al.; "Robust Sychronization for OFDM Employing Zadoff-Chu Sequence"; 46th Annual Conference on Information Sciences and Systems (CISS); IEEE; 2012; 6 pages.

* cited by examiner

TO

SYNCHRONIZATION SIGNAL SENDING METHOD, SYNCHRONIZATION SIGNAL RECEIVING METHOD, AND RELATED APPARATUSES

CROSS-REFERENCE TO RELATED APPLICATIONS

This application is a continuation of International Application No. PCT/CN2014/084721, filed on Aug. 19, 2014, the disclosure of which is hereby incorporated by reference in its entirety.

TECHNICAL FIELD

The present disclosure relates to the communications field, and in particular, to a synchronization signal sending method, a synchronization signal receiving method, and related apparatuses.

BACKGROUND

As communications technologies develop, an M2M (Machine to Machine) technology has been widely applied in various fields. In the M2M technology, to reduce costs, precision of a crystal oscillator of a receive end device is limited, and compared with an original signal sent by a transmit end device, a signal received by the receive end device has a relatively large frequency offset. Therefore, the transmit end device and the receive end device need to perform signal synchronization in a case of a relatively large carrier frequency offset. In the communications field at a present stage, there are many signal synchronization methods. Using LTE (Long Term Evolution) as an example, because a ZC (Zadoff-Chu) sequence has good autocorrelation and a stable amplitude, synchronization is performed by using the ZC sequence as a primary synchronization sequence in the LTE.

In an M2M system, to improve spectrum use efficiency, a frequency may be reused in different cells, to implement single-frequency networking. In the LTE, frequency reuse with a reuse factor of 3 is used for a synchronization channel, and different cells are distinguished by using ZC sequences with different root indexes as primary synchronization sequences. Generally, in the LTE, three groups of cells are distinguished by using primary synchronization sequences, the three groups of cells respectively use ZC sequences with root indexes of 29, 24, and 25 as the primary synchronization sequences, and UE determines, according to cross-correlation between the ZC sequences with different root indexes, a group to which a cell belongs.

If a ZC sequence with a good property can be applied to the M2M technology according to the prior art, signal synchronization in single-frequency networking may be implemented in the M2M system. When single-frequency networking is being performed in the prior art, to distinguish different cells, root indexes of ZC sequences of the cells are different from each other. However, in the M2M technology, a signal received by a receive end device has a relatively large frequency offset. The study found that, only a ZC sequence with a root index being +1 or −1 can meet an M2M synchronization requirement in the case of a relatively large frequency offset, but the only two root indexes cannot meet a requirement of distinguishing different cells in the M2M technology. As a result, unlike the prior art, signal synchronization in single-frequency networking cannot be performed by using a ZC sequence in the M2M technology. The ZC sequence with a root index of −1 refers to a conjugate sequence of the ZC sequence with a root index of 1, and this is the same hereinafter.

SUMMARY

Embodiments of the present disclosure provide a synchronization signal sending method, a synchronization signal receiving method, and related apparatuses, to implement signal synchronization in an M2M technology by using a ZC sequence with a root index being +1 or −1.

A first aspect of the embodiments of the present disclosure provides a synchronization signal sending method, including:

determining, by a transmit end device, a first signal, where the transmit end device operates in a serving cell, the first signal includes a first synchronization sequence, the first synchronization sequence is a sequence obtained after a special ZC sequence is cyclically shifted by a first quantity of digits and then dot multiplication or conjugate multiplication is performed on the cyclically shifted special ZC sequence and a characteristic sequence, the special ZC sequence is a ZC sequence with a root index being +1 or −1, the characteristic sequence and/or the first quantity of digits are/is corresponding to a cell identity of the serving cell, and the characteristic sequence is used to distinguish the serving cell from another cell; and sending, by the transmit end device, the first signal to a receive end device, so that the receive end device performs synchronization according to the first signal.

With reference to the first aspect of the embodiments of the present disclosure, in a first implementation manner of the first aspect of the embodiments of the present disclosure, the determining, by a transmit end device, a first signal includes:

determining, by the transmit end device, the cell identity of the serving cell;

determining, by the transmit end device, the characteristic sequence and/or the first quantity of digits according to the cell identity of the serving cell; and determining, by the transmit end device, the first signal according to the characteristic sequence and/or the first quantity of digits.

With reference to the first aspect of the embodiments of the present disclosure or the first implementation manner of the first aspect, in a second implementation manner of the first aspect of the embodiments of the present disclosure, the characteristic sequence includes:

a pseudo-random sequence, a Walsh sequence, a Hadamard sequence, a Gold sequence, or a ZC sequence.

A second aspect of the embodiments of the present disclosure provides a synchronization signal sending method, including:

determining, by a transmit end device, a second signal, where the second signal includes a second synchronization sequence, the second synchronization sequence is a sequence obtained after a special ZC sequence is cyclically shifted by a second quantity of digits, the special ZC sequence is a ZC sequence with a root index being +1 or −1, the transmit end device operates in a serving cell, and the second quantity of digits is corresponding to a cell identity of the serving cell; and sending, by the transmit end device, the second signal to a receive end device, so that the receive end device performs synchronization according to the second signal.

With reference to the second aspect of the embodiments of the present disclosure, in a first implementation manner of the second aspect of the embodiments of the present disclosure, the determining, by a transmit end device, a second signal includes:

determining, by the transmit end device, the cell identity of the serving cell;

determining, by the transmit end device, the second quantity of digits according to the cell identity of the serving cell; and determining, by the transmit end device, the second signal according to the second quantity of digits.

A third aspect of the embodiments of the present disclosure provides a synchronization signal receiving method, including:

receiving, by a receive end device, a first signal sent by a transmit end device, where the receive end device operates in a serving cell, the first signal includes a first synchronization sequence, the first synchronization sequence is a sequence obtained after a special ZC sequence is cyclically shifted by a first quantity of digits and then dot multiplication or conjugate multiplication is performed on the cyclically shifted special ZC sequence and the characteristic sequence, the special ZC sequence is a ZC sequence with a root index being +1 or −1, the characteristic sequence and/or the first quantity of digits are/is corresponding to a cell identity of the serving cell, and the characteristic sequence is used to distinguish the serving cell from another cell; and performing, by the receive end device, synchronization on the first signal.

With reference to the third aspect of the embodiments of the present disclosure, in a first implementation manner of the third aspect of the embodiments of the present disclosure, the performing, by the receive end device, synchronization on the first signal includes:

determining, by the receive end device, an integer frequency offset of the first signal;

determining, by the receive end device, a fractional frequency offset of the first signal; and determining, by the receive end device, the cell identity of the serving cell.

With reference to the first implementation manner of the third aspect of the embodiments of the present disclosure, in a second implementation manner of the third aspect of the embodiments of the present disclosure, the determining, by the receive end device, an integer frequency offset of the first signal includes:

determining, by the receive end device, at least one check sequence group, where each check sequence group includes a check characteristic sequence and a first check ZC sequence, and the first check ZC sequence is a sequence obtained after the special ZC sequence is cyclically shifted by a first quantity of check digits;

for each check sequence group, de-characterizing, by the receive end device, the first synchronization sequence by using the check characteristic sequence in the check sequence group; performing frequency compensation on the de-characterized first synchronization sequence by using at least one frequency value, to obtain a first compensation sequence corresponding to each frequency value; performing sliding correlation on each first compensation sequence by using the first check ZC sequence, to obtain a sliding correlation peak corresponding to each first compensation sequence; and determining a maximum sliding correlation peak of the sliding correlation peak corresponding to each first compensation sequence as a check peak corresponding to the check sequence group;

determining, by the receive end device, a maximum check peak of the check peak corresponding to each check sequence group as a first maximum correlation peak; and determining, by the receive end device, an opposite number of a frequency value corresponding to the first maximum correlation peak as the integer frequency offset of the first signal.

With reference to the second implementation manner of the third aspect of the embodiments of the present disclosure, in a third implementation manner of the third aspect of the embodiments of the present disclosure, the determining, by the receive end device, a fractional frequency offset of the first signal includes:

determining, by the receive end device, a first offset of the first maximum correlation peak relative to a starting location of the first synchronization sequence, and calculating the fractional frequency offset of the first signal according to the first offset.

With reference to the second implementation manner of the third aspect of the embodiments of the present disclosure or the third implementation manner of the third aspect, in a fourth implementation manner of the third aspect of the embodiments of the present disclosure, the determining the cell identity of the serving cell includes:

determining, by the receive end device, a check characteristic sequence corresponding to the first maximum correlation peak as the characteristic sequence, and determining a first quantity of check digits corresponding to the first maximum correlation peak as the first quantity of digits; and determining, by the receive end device, the cell identity of the serving cell according to the characteristic sequence and/or the first quantity of digits.

A fourth aspect of the embodiments of the present disclosure provides a synchronization signal receiving method, including:

receiving, by a receive end device, a second signal sent by a transmit end device, where the second signal includes a second synchronization sequence, the second synchronization sequence is a sequence obtained after a special ZC sequence is cyclically shifted by a second quantity of digits, the special ZC sequence is a ZC sequence with a root index being +1 or −1, the receive end device operates in a serving cell, and the second quantity of digits is corresponding to a cell identity of the serving cell; and performing, by the receive end device, synchronization on the second signal.

With reference to the fourth aspect of the embodiments of the present disclosure, in a first implementation manner of the fourth aspect of the embodiments of the present disclosure, the performing, by the receive end device, synchronization on the second signal includes:

determining, by the receive end device, an integer frequency offset of the second signal;

determining, by the receive end device, a fractional frequency offset of the second signal; and determining, by the receive end device, the cell identity of the serving cell.

With reference to the first implementation manner of the fourth aspect of the embodiments of the present disclosure, in a second implementation manner of the fourth aspect of the embodiments of the present disclosure, the determining, by the receive end device, an integer frequency offset of the second signal includes:

determining, by the receive end device, at least one second check ZC sequence, where the second check ZC sequence is a sequence obtained after the special ZC sequence is cyclically shifted by a second quantity of check digits;

for each second check ZC sequence, performing, by the receive end device, frequency compensation on the second synchronization sequence by using at least one frequency value, to obtain a second compensation sequence corresponding to each frequency value; performing sliding correlation on each second compensation sequence by using the second check ZC sequence, to obtain a sliding correlation peak corresponding to each second compensation sequence; and determining a maximum sliding correlation peak of the sliding correlation peak corresponding to each second compensation sequence as a check peak corresponding to the second check ZC sequence;

determining, by the receive end device, a maximum check peak of the check peak corresponding to each second check ZC sequence as a second maximum correlation peak; and determining, by the receive end device, an opposite number of a frequency value corresponding to the second maximum correlation peak as the integer frequency offset of the second signal.

With reference to the second implementation manner of the fourth aspect of the embodiments of the present disclosure, in a third implementation manner of the fourth aspect of the embodiments of the present disclosure, the determining, by the receive end device, a fractional frequency offset of the second signal includes:

determining, by the receive end device, a second offset of the second maximum correlation peak relative to a starting location of the second synchronization sequence, and calculating the fractional frequency offset of the second signal according to the second offset.

With reference to the second implementation manner of the fourth aspect of the embodiments of the present disclosure or the third implementation manner of the fourth aspect, in a fourth implementation manner of the fourth aspect of the embodiments of the present disclosure, the determining the cell identity of the serving cell includes:

determining, by the receive end device, a second quantity of check digits corresponding to the second maximum correlation peak as the second quantity of digits; and determining, by the receive end device, the cell identity of the serving cell according to the second quantity of digits.

A fifth aspect of the embodiments of the present disclosure provides a transmit end device, including:

a first determining module, configured to determine a first signal, where the transmit end device operates in a serving cell, the first signal includes a first synchronization sequence, the first synchronization sequence is a sequence obtained after a special ZC sequence is cyclically shifted by a first quantity of digits and then dot multiplication or conjugate multiplication is performed on the cyclically shifted special ZC sequence and a characteristic sequence, the special ZC sequence is a ZC sequence with a root index being +1 or −1, the characteristic sequence and/or the first quantity of digits are/is corresponding to a cell identity of the serving cell, and the characteristic sequence is used to distinguish the serving cell from another cell; and a first sending module, configured to send the first signal to a receive end device, so that the receive end device performs synchronization according to the first signal.

With reference to the fifth aspect of the embodiments of the present disclosure, in a first implementation manner of the fifth aspect of the embodiments of the present disclosure, the first determining module includes:

a first identity unit, configured to determine the cell identity of the serving cell;

a first sequence unit, configured to determine the characteristic sequence and/or the first quantity of digits according to the cell identity of the serving cell; and a first signal unit, configured to determine the first signal according to the characteristic sequence and/or the first quantity of digits.

A sixth aspect of the embodiments of the present disclosure provides a transmit end device, including:

a second determining module, configured to determine a second signal, where the second signal includes a second synchronization sequence, the second synchronization sequence is a sequence obtained after a special ZC sequence is cyclically shifted by a second quantity of digits, the special ZC sequence is a ZC sequence with a root index being +1 or −1, the transmit end device operates in a serving cell, and the second quantity of digits is corresponding to a cell identity of the serving cell; and a second sending module, configured to send the second signal to a receive end device, so that the receive end device performs synchronization according to the second signal.

With reference to the sixth aspect of the embodiments of the present disclosure, in a first implementation manner of the sixth aspect of the embodiments of the present disclosure, the second determining module includes:

a second identity unit, configured to determine the cell identity of the serving cell;

a second sequence unit, configured to determine the second quantity of digits according to the cell identity of the serving cell; and a second signal unit, configured to determine the second signal according to the second quantity of digits.

A seventh aspect of the embodiments of the present disclosure provides a receive end device, including:

a first receiving module, configured to receive a first signal sent by a transmit end device, where the receive end device operates in a serving cell, the first signal includes a first synchronization sequence, the first synchronization sequence is a sequence obtained after a special ZC sequence is cyclically shifted by a first quantity of digits and then dot multiplication or conjugate multiplication is performed on the cyclically shifted special ZC sequence and the characteristic sequence, the special ZC sequence is a ZC sequence with a root index being +1 or −1, the characteristic sequence and/or the first quantity of digits are/is corresponding to a cell identity of the serving cell, and the characteristic sequence is used to distinguish the serving cell from another cell; and a first synchronization module, configured to perform synchronization on the first signal.

With reference to the seventh aspect of the embodiments of the present disclosure, in a first implementation manner of the seventh aspect of the embodiments of the present disclosure, the first synchronization module includes:

a first integer frequency offset unit, configured to determine an integer frequency offset of the first signal; and a first fractional frequency offset unit, configured to determine a fractional frequency offset of the first signal.

With reference to the first implementation manner of the seventh aspect of the embodiments of the present disclosure, in a second implementation manner of the seventh aspect of the embodiments of the present disclosure, the first integer frequency offset unit is specifically configured to:

determine at least one check sequence group, where each check sequence group includes a check characteristic sequence and a first check ZC sequence, and the first check ZC sequence is a sequence obtained after the special ZC sequence is cyclically shifted by a first quantity of check digits;

for each check sequence group, de-characterize the first synchronization sequence by using the check characteristic sequence in the check sequence group; perform frequency compensation on the de-characterized first synchronization sequence by using at least one frequency value, to obtain a first compensation sequence corresponding to each frequency value; perform sliding correlation on each first compensation sequence by using the first check ZC sequence, to obtain a sliding correlation peak corresponding to each first compensation sequence; and determine a maximum sliding correlation peak of the sliding correlation peak corresponding to each first compensation sequence as a check peak corresponding to the check sequence group;

determine a maximum check peak of the check peak corresponding to each check sequence group as a first maximum correlation peak; and determine an opposite number of a frequency value corresponding to the first maximum correlation peak as the integer frequency offset of the first signal.

With reference to the second implementation manner of the seventh aspect of the embodiments of the present disclosure, in a third implementation manner of the seventh aspect of the embodiments of the present disclosure, the first fractional frequency offset unit is specifically configured to:

determine a first offset of the first maximum correlation peak relative to a starting location of the first synchronization sequence, and calculate the fractional frequency offset of the first signal according to the first offset.

With reference to the second implementation manner of the seventh aspect of the embodiments of the present disclosure or the third implementation manner of the seventh aspect, in a fourth implementation manner of the seventh aspect of the embodiments of the present disclosure, the first synchronization module further includes:

a first check determining unit, configured to: determine a check characteristic sequence corresponding to the first maximum correlation peak as the characteristic sequence, and determine a first quantity of check digits corresponding to the first maximum correlation peak as the first quantity of digits; and a first identity determining unit, configured to determine the cell identity of the serving cell according to the characteristic sequence and/or the first quantity of digits.

An eighth aspect of the embodiments of the present disclosure provides a receive end device, including:

a second receiving module, configured to receive a second signal sent by a transmit end device, where the second signal includes a second synchronization sequence, the second synchronization sequence is a sequence obtained after a special ZC sequence is cyclically shifted by a second quantity of digits, the special ZC sequence is a ZC sequence with a root index being +1 or −1, the receive end device operates in a serving cell, and the second quantity of digits is corresponding to a cell identity of the serving cell; and a second synchronization module, configured to perform synchronization on the second signal.

With reference to the eighth aspect of the embodiments of the present disclosure, in a first implementation manner of the eighth aspect of the embodiments of the present disclosure, the second synchronization module includes:

a second integer frequency offset unit, configured to determine an integer frequency offset of the second signal; and a second fractional frequency offset unit, configured to determine a fractional frequency offset of the second signal.

With reference to the first implementation manner of the eighth aspect of the embodiments of the present disclosure, in a second implementation manner of the eighth aspect of the embodiments of the present disclosure, the second integer frequency offset unit is specifically configured to:

determine at least one second check ZC sequence, where the second check ZC sequence is a sequence obtained after the special ZC sequence is cyclically shifted by a second quantity of check digits;

for each second check ZC sequence, perform frequency compensation on the second synchronization sequence by using at least one frequency value, to obtain a second compensation sequence corresponding to each frequency value; perform sliding correlation on each second compensation sequence by using the second check ZC sequence, to obtain a sliding correlation peak corresponding to each second compensation sequence; and determine a maximum sliding correlation peak of the sliding correlation peak corresponding to each second compensation sequence as a check peak corresponding to the second check ZC sequence;

determine a maximum check peak of the check peak corresponding to each second check ZC sequence as a second maximum correlation peak; and determine an opposite number of a frequency value corresponding to the second maximum correlation peak as the integer frequency offset of the second signal.

With reference to the second implementation manner of the eighth aspect of the embodiments of the present disclosure, in a third implementation manner of the eighth aspect of the embodiments of the present disclosure, the second fractional frequency offset unit is specifically configured to:

determine a second offset of the second maximum correlation peak relative to a starting location of the second synchronization sequence, and calculate the fractional frequency offset of the second signal according to the second offset.

With reference to the second implementation manner of the eighth aspect of the embodiments of the present disclosure or the third implementation manner of the eighth aspect, in a fourth implementation manner of the eighth aspect of the embodiments of the present disclosure, the second synchronization module further includes:

a second check determining unit, configured to determine a second quantity of check digits corresponding to the second maximum correlation peak as the second quantity of digits; and a second identity determining unit, configured to determine the cell identity of the serving cell according to the second quantity of digits.

In the synchronization signal sending method provided in the present disclosure, a transmit end device determines a first signal, where the transmit end device operates in a serving cell, the first signal includes a first synchronization sequence, the first synchronization sequence is a sequence obtained after a special ZC sequence is cyclically shifted by a first quantity of digits and then dot multiplication or conjugate multiplication is performed on the cyclically shifted special ZC sequence and a characteristic sequence, the special ZC sequence is a ZC sequence with a root index being +1 or −1, and the characteristic sequence and/or the first quantity of digits are/is corresponding to a cell identity of the serving cell; and the transmit end device sends the first signal to a receive end device, so that the receive end device performs synchronization according to the first signal. Because the first synchronization sequence included in the first signal sent by the transmit end device in the embodiments of the present disclosure is obtained after the special ZC sequence is cyclically shifted by the first quantity of digits and then dot multiplication or conjugate multiplication is performed on the cyclically shifted special ZC sequence and the characteristic sequence, different cells may be distinguished by using different characteristic sequences, and/or distinguished by using different quantities of digits of cyclic shifts of the ZC sequence with a root index being +1 or −1, and a requirement of distinguishing the different cells may be met without setting root indexes of ZC sequences of the different cells to different values, thereby implementing signal synchronization in an M2M technology by using the ZC sequence with a root index being +1 or −1.

DETAILED DESCRIPTION

Embodiments of the present disclosure provide a synchronization signal sending method, a synchronization signal receiving method, and related apparatuses, which are separately described below. Both a transmit end device and a receive end device in the embodiments of the present disclosure may refer to a base station, UE, a relay, an access point, a small cell, or another device, and are not limited in the embodiments of the present disclosure.

Figure 1:
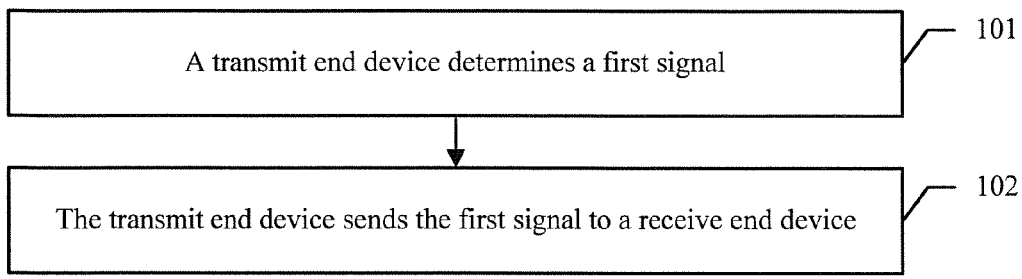
FIG. 1 is a flowchart of an embodiment of a synchronization signal sending method according to an embodiment of the present disclosure.

Referring to FIG. 1, a basic procedure of a synchronization signal sending method provided in an embodiment of the present disclosure includes the following steps.

101. A transmit end device determines a first signal.

The transmit end device determines the first signal, where the transmit end device operates in a serving cell, the first signal includes a first synchronization sequence, the first synchronization sequence is a sequence obtained after a special ZC sequence is cyclically shifted by a first quantity of digits and then dot multiplication or conjugate multiplication is performed on the cyclically shifted special ZC sequence and the characteristic sequence, the characteristic sequence is used to distinguish the serving cell from another cell, and the characteristic sequence and/or the first quantity of digits are/is corresponding to a cell identity of the serving cell.

The special ZC sequence is a ZC sequence with a root index being +1 or −1, and a general formula of the special ZC sequence is or $Z(n)=e^{-j\pi n(n+1+2q)/L}$ or $Z(n)=e^{j\pi n(n+1+2q)/L}$, where q is used to represent any integer, L is used to represent a length of the special ZC sequence, and a value range of n is [0, L−1].

After the special ZC sequence is cyclically shifted by the first quantity of digits and then dot multiplication or conjugate multiplication is performed on the cyclically shifted special ZC sequence and the characteristic sequence, the first synchronization sequence is obtained. To distinguish different cells, different first synchronization sequences should be set for the cells. It may be understood that, the different first synchronization sequences may be set for the different cells provided that different characteristic sequences are set for the different cells and/or different quantities of digits of cyclic shifts of the special ZC sequence are set for the different cells. Therefore, in this embodiment, the characteristic sequence of the serving cell is corresponding to the cell identity of the serving cell, so that the characteristic sequence of the serving cell is different from a characteristic sequence of another cell; and/or, the first quantity of digits is corresponding to the cell identity of the serving cell, so that a quantity of digits of a cyclic shift of the special ZC sequence of the serving cell is different from that of another cell.

Because the cyclic shift includes a left shift and a right shift, a shift in any direction may be set to be positive. For ease of description, quantities of digits of all right shifts are positive values by default in this application. For example, a sequence A is [1, 2, 3, 4, 5, 6], when a quantity of digits of a cyclic shift is 2, the sequence A is changed to [5, 6, 1, 2, 3, 4] after the cyclic shift; and when a quantity of digits of a cyclic shift is −2, the sequence A is changed to [3, 4, 5, 6, 1, 2] after the cyclic shift. That the special ZC sequence is cyclically shifted by the first quantity of digits means: the special ZC sequence is cyclically shifted, and a quantity of digits of the cyclic shift is the first quantity of digits. The special ZC sequence is cyclically shifted by the first quantity of digits, and an absolute value of the first quantity of digits should be less than the length L of the special ZC sequence. That is, a value range of the first quantity of digits is any integer in (−L, L). It may be understood that, when the first quantity of digits is 0, the special ZC sequence is not cyclically shifted.

102. The transmit end device sends the first signal to a receive end device.

The transmit end device sends the first signal to the receive end device, so that the receive end device performs synchronization according to the first signal. A specific method for performing synchronization by the receive end device according to the first signal is described in detail in the following embodiment, and is not limited in this embodiment.

In this embodiment, a transmit end device determines a first signal, where the transmit end device operates in a serving cell, the first signal includes a first synchronization sequence, the first synchronization sequence is a sequence obtained after a special ZC sequence is cyclically shifted by a first quantity of digits and then dot multiplication or conjugate multiplication is performed on the cyclically shifted special ZC sequence and the characteristic sequence, the special ZC sequence is a ZC sequence with a root index being +1 or −1, and the characteristic sequence and/or the first quantity of digits are/is corresponding to a cell identity of the serving cell; and the transmit end device sends the first signal to a receive end device, so that the receive end device performs synchronization according to the first signal. Because the first synchronization sequence included in the first signal sent by the transmit end device in this embodiment of the present disclosure is obtained after the special ZC sequence is cyclically shifted by the first quantity of digits and then dot multiplication or conjugate multiplication is performed on the cyclically shifted special ZC sequence and the characteristic sequence, different cells may be distinguished by using different characteristic sequences, and/or distinguished by using different quantities of digits of cyclic shifts of the ZC sequence with a root index being +1 or −1, and a requirement of distinguishing the different cells may be met without setting root indexes of ZC sequences of the different cells to different values, thereby implementing signal synchronization in an M2M technology by using the ZC sequence with a root index being +1 or −1.

Figure 2:
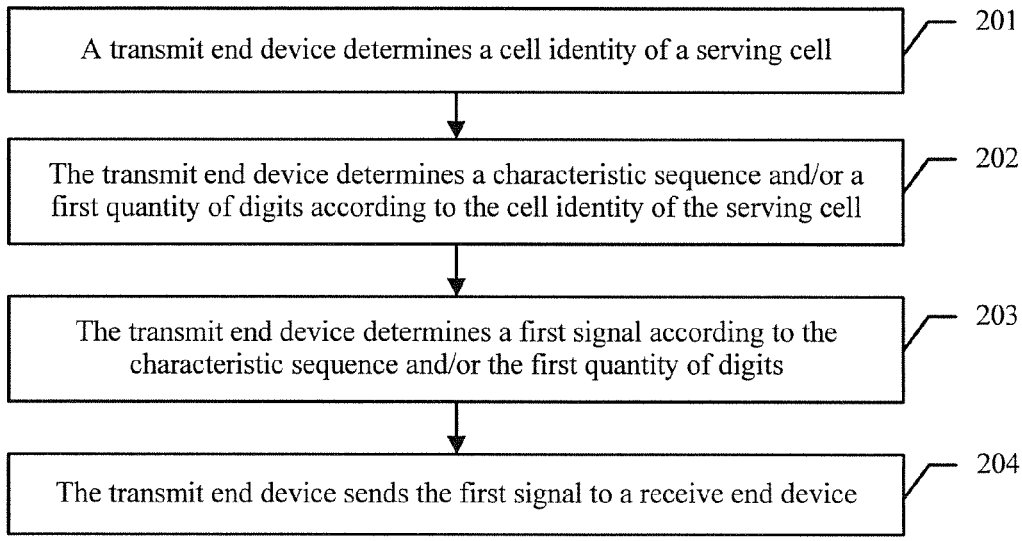
FIG. 2 is a flowchart of another embodiment of a synchronization signal sending method according to an embodiment of the present disclosure.

The embodiment shown in FIG. 1 provides the basic procedure of the synchronization signal sending method provided in the present disclosure, and the transmit end device needs to determine the first signal first. The following embodiment provides a specific procedure of determining the first signal by the transmit end device. Referring to FIG. 2, a basic procedure of another synchronization signal sending method provided in an embodiment of the present disclosure includes the following steps.

201. A transmit end device determines a cell identity of a serving cell.

202. The transmit end device determines a characteristic sequence and/or a first quantity of digits according to the cell identity of the serving cell.

At least one of the characteristic sequence or the first quantity of digits is corresponding to the cell identity of the serving cell. Details are as follows:

If the characteristic sequence is corresponding to the cell identity of the serving cell, the first quantity of digits of the serving cell is the same as those of multiple other cells, and a transmit end already knows the first quantity of digits, the transmit end device determines the characteristic sequence according to the cell identity of the serving cell and a correspondence between the characteristic sequence and the cell identity of the serving cell.

If both the characteristic sequence and the first quantity of digits are corresponding to the cell identity of the serving cell, the transmit end device determines the characteristic sequence and the first quantity of digits according to the cell identity of the serving cell and a correspondence between the cell identity of the serving cell and each of the characteristic sequence and the first quantity of digits.

203. The transmit end device determines a first signal according to the characteristic sequence and/or the first quantity of digits.

The transmit end device determines a first synchronization sequence and the first signal according to the characteristic sequence and/or the first quantity of digits. Specifically, the transmit end device determines that a sequence obtained after a special ZC sequence is cyclically shifted by the first quantity of digits and then dot multiplication or conjugate multiplication is performed on the cyclically shifted special ZC sequence and the characteristic sequence is the first synchronization sequence, and determines the first signal including the first synchronization sequence.

204. The transmit end device sends the first signal to a receive end device.

The transmit end device sends the first signal to the receive end device, so that the receive end device performs synchronization according to the first signal. A specific method for performing synchronization by the receive end device according to the first signal is described in detail in the following embodiment, and is not limited in this embodiment.

In this embodiment, a transmit end device determines a cell identity of a serving cell; determines a characteristic sequence and/or a first quantity of digits according to the cell identity of the serving cell; determines a first synchronization sequence and a first signal according to the characteristic sequence and/or the first quantity of digits; and sends the first signal to a receive end device, so that the receive end device performs synchronization according to the first signal. Because the first synchronization sequence included in the first signal sent by the transmit end device in this embodiment of the present disclosure is obtained after a special ZC sequence is cyclically shifted by the first quantity of digits and then dot multiplication or conjugate multiplication is performed on the cyclically shifted special ZC sequence and the characteristic sequence, different cells may be distinguished by using different characteristic sequences, and/or distinguished by using different quantities of digits of cyclic shifts of a ZC sequence with a root index being +1 or −1, and a requirement of distinguishing the different cells may be met without setting root indexes of ZC sequences of the different cells to different values, thereby implementing signal synchronization in an M2M technology by using the ZC sequence with a root index being +1 or −1.

There are many types of characteristic sequences, including a pseudo-random sequence, a Walsh sequence, a Hadamard sequence, a Gold sequence, or a ZC sequence, and are not limited herein.

Particularly, if the characteristic sequence is a pseudo-random sequence or a Gold sequence, the corresponding pseudo-random sequence or the corresponding Gold sequence may be generated by using the cell identity of the serving cell as an initial seed, so that the characteristic sequence corresponds to the cell identity of the serving cell.

Figure 3:
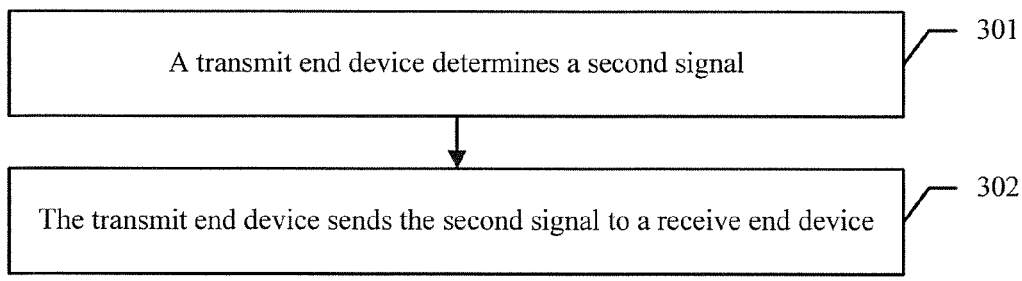
FIG. 3 is a flowchart of another embodiment of a synchronization signal sending method according to an embodiment of the present disclosure.

The embodiments shown in FIG. 1 and FIG. 2 provide the basic procedures of the synchronization signal sending methods provided in the embodiments of the present disclosure, and different cells are distinguished by cyclically shifting the special ZC sequence by the first quantity of digits and then performing dot multiplication or conjugate multiplication on the cyclically shifted special ZC sequence and the characteristic sequence. The following embodiment provides a new synchronization signal sending method, to distinguish different cells in another manner. Referring to FIG. 3, a basic procedure of another synchronization signal sending method provided in an embodiment of the present disclosure includes the following steps.

301. A transmit end device determines a second signal.

The transmit end device determines the second signal, where the second signal includes a second synchronization sequence, the second synchronization sequence is a sequence obtained after a special ZC sequence is cyclically shifted by a second quantity of digits, the special ZC sequence is a ZC sequence with a root index being +1 or −1, the transmit end device operates in a serving cell, and the second quantity of digits is corresponding to a cell identity of the serving cell.

After the special ZC sequence is cyclically shifted by the second quantity of digits, the second synchronization sequence is obtained. To distinguish different cells, different second synchronization sequences should be set for the cells. It may be understood that, the different second synchronization sequences may be set for the different cells provided that different quantities of digits of cyclic shifts of the special ZC sequence are set for the different cells. Therefore, in this embodiment, the second quantity of digits is corresponding to the cell identity of the serving cell, so that a quantity of digits of a cyclic shift of the special ZC sequence of the serving cell is different from that of another cell.

302. The transmit end device sends the second signal to a receive end device.

The transmit end device sends the second signal to the receive end device, so that the receive end device performs synchronization according to the second signal. A specific method for performing synchronization by the receive end device according to the second signal is described in detail in the following embodiment, and is not limited in this embodiment.

In this embodiment, a transmit end device determines a second signal, where the second signal includes a second synchronization sequence, the second synchronization sequence is a sequence obtained after a special ZC sequence is cyclically shifted by a second quantity of digits, the special ZC sequence is a ZC sequence with a root index being +1 or −1, the transmit end device operates in a serving cell, and the second quantity of digits is corresponding to a cell identity of the serving cell; and the transmit end device sends the second signal to a receive end device, so that the receive end device performs synchronization according to the second signal. Because the second synchronization sequence included in the second signal sent by the transmit end device in this embodiment of the present disclosure is obtained after the special ZC sequence is cyclically shifted by the second quantity of digits, different cells may be distinguished by using different quantities of digits of cyclic shifts of the ZC sequence with a root index being +1 or −1, and a requirement of distinguishing the different cells may be met without setting root indexes of ZC sequences of the different cells to different values, thereby implementing signal synchronization in an M2M technology by using the ZC sequence with a root index being +1 or −1.

Figure 4:
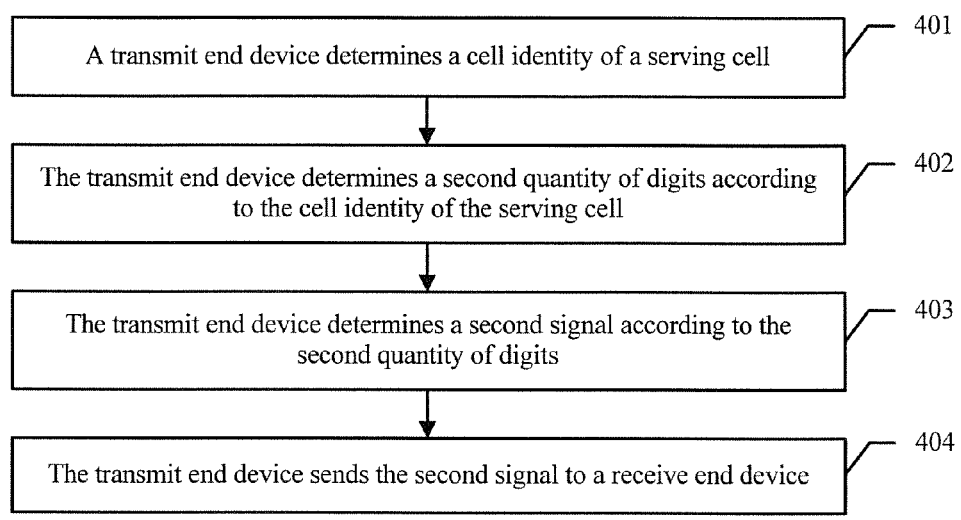
FIG. 4 is a flowchart of another embodiment of a synchronization signal sending method according to an embodiment of the present disclosure.

The embodiment shown in FIG. 3 provides the basic procedure of another synchronization signal sending method provided in the present disclosure, and the transmit end device needs to determine the second signal first. The following embodiment provides a specific procedure of determining the second signal by the transmit end device. Referring to FIG. 4, a basic procedure of another synchronization signal sending method provided in an embodiment of the present disclosure includes the following steps.

401. A transmit end device determines a cell identity of a serving cell.

402. The transmit end device determines a second quantity of digits according to the cell identity of the serving cell.

The second quantity of digits is corresponding to the cell identity of the serving cell. In this embodiment, after determining the cell identity of the serving cell, the transmit end device determines the second quantity of digits according to the cell identity of the serving cell and a correspondence between the second quantity of digits and the cell identity.

403. The transmit end device determines a second signal according to the second quantity of digits.

The transmit end device determines the second signal according to the second quantity of digits. Specifically, the transmit end device determines that a sequence obtained after a special ZC sequence is cyclically shifted by the second quantity of digits is a second synchronization sequence, and determines the second signal including the second synchronization sequence.

404. The transmit end device sends the second signal to a receive end device.

The transmit end device sends the second signal to the receive end device, so that the receive end device performs synchronization according to the second signal. A specific method for performing synchronization by the receive end device according to the second signal is described in detail in the following embodiment, and is not limited in this embodiment.

In this embodiment, a transmit end device determines a cell identity of a serving cell; determines a second quantity of digits according to the cell identity of the serving cell; determines a second synchronization sequence and a second signal according to the second quantity of digits; and sends the second signal to a receive end device, so that the receive end device performs synchronization according to the second signal. Because the second synchronization sequence included in the second signal sent by the transmit end device in this embodiment of the present disclosure is obtained after a special ZC sequence is cyclically shifted by the second quantity of digits, different cells may be distinguished by using different quantities of digits of cyclic shifts of a ZC sequence with a root index being +1 or −1, and a requirement of distinguishing the different cells may be met without setting root indexes of ZC sequences of the different cells to different values, thereby implementing signal synchronization in an M2M technology by using the ZC sequence with a root index being +1 or −1.

In all the embodiments in FIG. 1 to FIG. 4, different cells are distinguished, so that the transmit end device may perform signal synchronization by using the ZC sequence with a root index being +1 or −1. It is worth pointing out that only the ZC sequence with a root index being +1 or −1 can meet an M2M signal synchronization requirement, and a principle thereof may be briefly explained below:

The study found that, the special ZC sequence with a root index being +1 or −1 has great anti-frequency offset performance, and the great anti-frequency offset performance is embodied in that, no matter how large a frequency offset value is on such a sequence, there is always an auto-correlation peak, and there is one and only one auto-correlation peak in a sequence length. In addition, there is a correspondence between an offset of the auto-correlation peak relative to a sequence start point and a frequency offset. Therefore, the frequency offset may be calculated according to the offset of the auto-correlation peak relative to the sequence start point. It may be strictly proved in a mathematical sense that, such a correspondence between an offset of the auto-correlation peak relative to a sequence start point and a frequency offset is applicable only to the special ZC sequence with a root index being +1 or −1.

Figure 5:
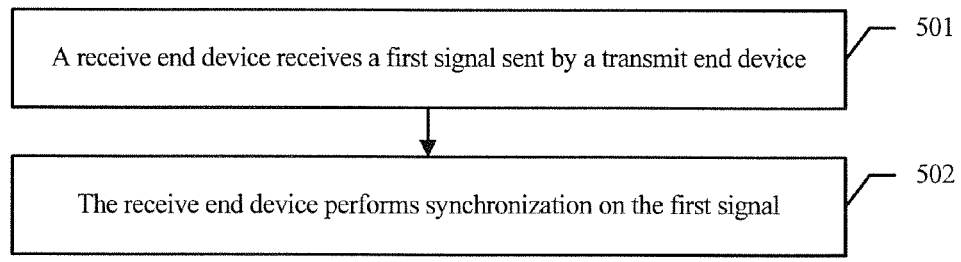
FIG. 5 is a flowchart of an embodiment of a synchronization signal receiving method according to an embodiment of the present disclosure.

The foregoing embodiments explain in detail the synchronization signal sending methods provided in the embodiments of the present disclosure. The following embodiment provides a corresponding synchronization signal receiving method. Referring to FIG. 5, a basic procedure of the synchronization signal receiving method includes the following steps.

501. A receive end device receives a first signal sent by a transmit end device.

The receive end device receives the first signal sent by the transmit end device, where the receive end device operates in a serving cell.

The first signal includes a first synchronization sequence, that is, a sequence obtained after a special ZC sequence is cyclically shifted by a first quantity of digits and then dot multiplication or conjugate multiplication is performed on the cyclically shifted special ZC sequence and a characteristic sequence. The special ZC sequence is a ZC sequence with a root index being +1 or −1, the characteristic sequence is used to distinguish the serving cell from another cell, and the characteristic sequence and/or the first quantity of digits are/is corresponding to a cell identity of the serving cell.

502. The receive end device performs synchronization on the first signal.

After receiving the first signal, the receive end device performs synchronization on the first signal. A specific method for performing synchronization by the receive end device is described in detail in the following embodiment, and is not limited in this embodiment.

In this embodiment, a receive end device receives a first signal sent by a transmit end device, where the receive end device operates in a serving cell, the first signal includes a first synchronization sequence, that is, a sequence obtained after a special ZC sequence is cyclically shifted by a first quantity of digits and then dot multiplication or conjugate multiplication is performed on the cyclically shifted special ZC sequence and the characteristic sequence, the special ZC sequence is a ZC sequence with a root index being +1 or −1, and the characteristic sequence and/or the first quantity of digits are/is corresponding to a cell identity of the serving cell; and the receive end device performs synchronization on the first signal. Because the first synchronization sequence included in the first signal received by the receive end device in this embodiment of the present disclosure is obtained after the special ZC sequence is cyclically shifted by the first quantity of digits and then dot multiplication or conjugate multiplication is performed on the cyclically shifted special ZC sequence and the characteristic sequence, the receive end device may distinguish different cells by using different characteristic sequences, and/or distinguish different cells by using different quantities of digits of cyclic shifts of the ZC sequence with a root index being +1 or −1, so that root indexes of ZC sequences in signals of the different cells received by the receive end device do not need to be different values, thereby implementing signal synchronization in an M2M technology by using the ZC sequence with a root index being +1 or −1.

Figures 6A, 6B:
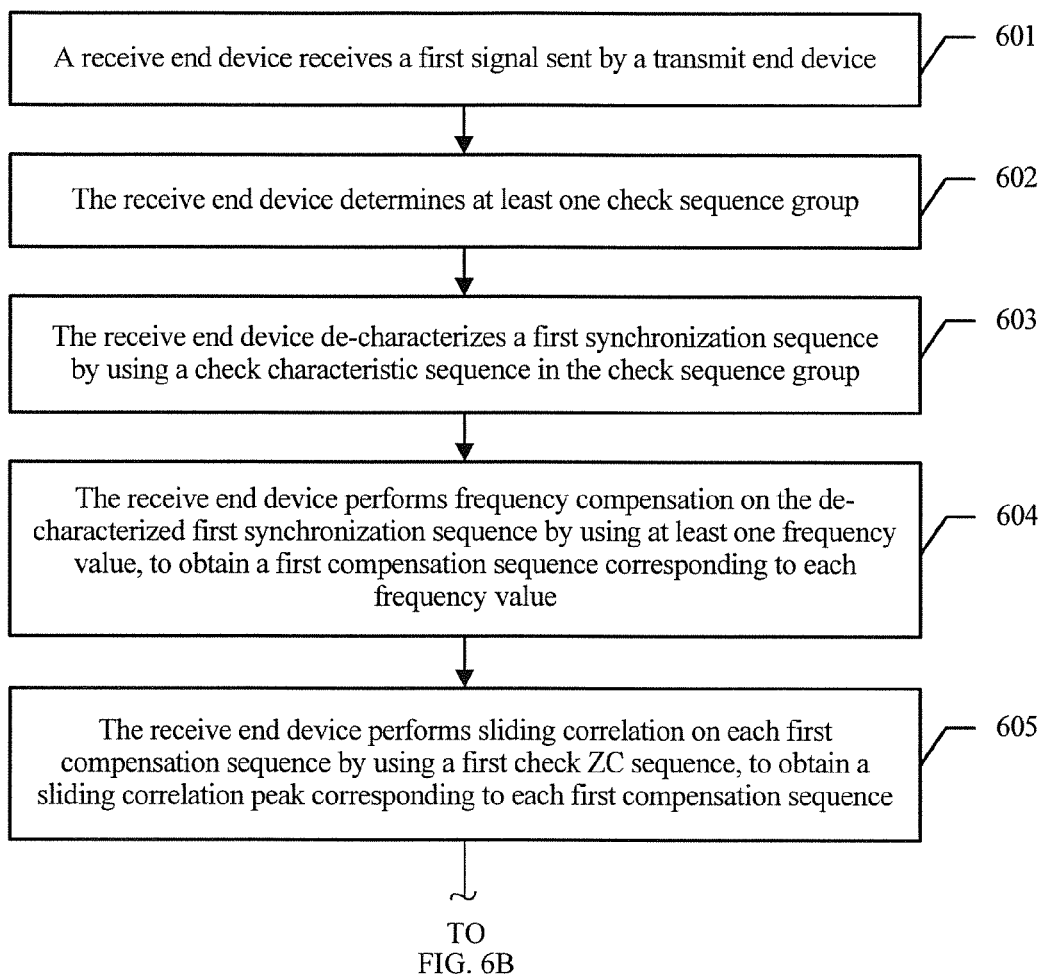
FIG. 6A and FIG. 6B are a flowchart of another embodiment of a synchronization signal receiving method according to an embodiment of the present disclosure.
Figure 6B:
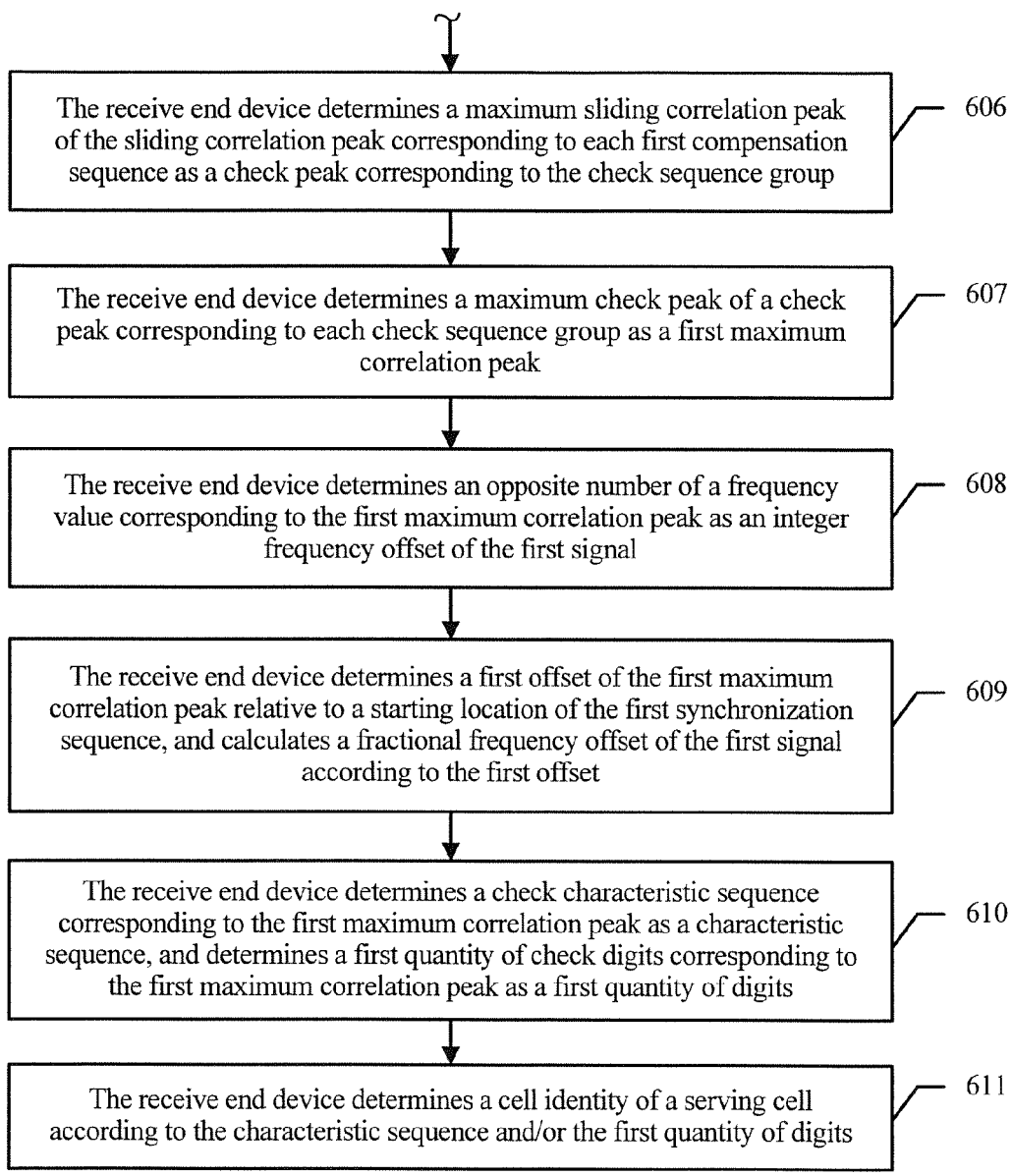

Generally, that the receive end device performs synchronization on the first signal mainly includes determining an integer frequency offset and a fractional frequency offset of the first signal. The following embodiment provides a relatively detailed description about a method for determining an integer frequency offset and a fractional frequency offset. Referring to FIG. 6A and FIG. 6B, a basic procedure of the method includes the following steps.

601. A receive end device receives a first signal sent by a transmit end device.

602. The receive end device determines at least one check sequence group.

The receive end device determines the at least one check sequence group, where each check sequence group comes from a combination of a characteristic sequence and a cyclically shifted special ZC sequence that may be used by all cells in the communications system. The characteristic sequence in each check sequence group is referred to as a check characteristic sequence, the cyclically shifted special ZC sequence in each check sequence group is referred to as a first check ZC sequence, and a quantity of digits of a cyclic shift of the first check ZC sequence is a first quantity of check digits.

For each check sequence group, the receive end device performs steps 603 to 606.

603. The receive end device de-characterizes a first synchronization sequence by using a check characteristic sequence in the check sequence group.

The receive end device de-characterizes the first synchronization sequence by using the check characteristic sequence in the check sequence group. A de-characterizing method is corresponding to the first synchronization sequence. For example, if the first synchronization sequence is obtained after a special ZC sequence is cyclically shifted by a first quantity of digits and then dot multiplication is performed on the cyclically shifted special ZC sequence and the characteristic sequence, the receive end device performs de-characterizing by performing conjugate multiplication on the check characteristic sequence and the first synchronization sequence; or if the first synchronization sequence is obtained after a special ZC sequence is cyclically shifted by a first quantity of digits and then conjugate multiplication is performed on the cyclically shifted special ZC sequence and the characteristic sequence, the receive end device performs de-characterizing by performing dot multiplication on the check characteristic sequence and the first synchronization sequence.

604. The receive end device performs frequency compensation on the de-characterized first synchronization sequence by using at least one frequency value, to obtain a first compensation sequence corresponding to each frequency value.

Frequency compensation may be implemented by using many methods. For example, if it is assumed that a signal that needs to be compensated is $s_1, s_2, \ldots, s_n$, and a frequency offset value required for compensation is $\varepsilon$, a compensated sequence is $cs_1, cs_2, \ldots, cs_n$, where $cs_i = e^{j2\pi i\varepsilon/B} s_i$, ($i=1, \ldots, n$), and B is used to represent signal bandwidth. Each frequency value used by the receive end device is an integer multiple of signal bandwidth of the first signal.

Preferably, the receive end device may determine, according to a maximum empirical value of a frequency offset in a communications system in which the receive end device is located, a value range of a frequency value used by a receive end for frequency compensation. For example, when the maximum empirical value of the frequency offset in the communications system is 2.7 B, the frequency value used by the receive end device for frequency compensation may be: −3 B, −2 B, −1 B, 0, 1 B, 2 B, or 3 B.

605. The receive end device performs sliding correlation on each first compensation sequence by using a first check ZC sequence, to obtain a sliding correlation peak corresponding to each first compensation sequence.

After obtaining the first compensation sequence corresponding to each frequency value, the receive end device performs sliding correlation on each first compensation sequence by using the first check ZC sequence, to obtain the sliding correlation peak corresponding to each first compensation sequence.

606. The receive end device determines a maximum sliding correlation peak of the sliding correlation peak corresponding to each first compensation sequence as a check peak corresponding to the check sequence group.

The receive end device obtains the sliding correlation peak corresponding to each first compensation sequence, and determines the maximum sliding correlation peak of the sliding correlation peak corresponding to each first compensation sequence as the check peak corresponding to the check sequence group.

After steps 603 to 606 are performed for all check sequence groups, step 607 is performed.

607. The receive end device determines a maximum check peak of a check peak corresponding to each check sequence group as a first maximum correlation peak.

After performing steps 603 to 606 for all the check sequence groups, the receive end device obtains check peaks corresponding to all the check sequence groups. The receive end device determines a maximum check peak of the check peaks as the first maximum correlation peak.

608. The receive end device determines an opposite number of a frequency value corresponding to the first maximum correlation peak as an integer frequency offset of the first signal.

In step 604, the receive end device performs frequency compensation on the de-characterized first synchronization sequence by using the at least one frequency value. In this step, after determining the first maximum correlation peak, the receive end device determines the opposite number of the frequency value corresponding to the first maximum correlation peak as the integer frequency offset of the first signal.

609. The receive end device determines a first offset of the first maximum correlation peak relative to a starting location of the first synchronization sequence, and calculates a fractional frequency offset of the first signal according to the first offset.

After determining the first maximum correlation peak, the receive end device determines the first offset of the first maximum correlation peak relative to the starting location of the first synchronization sequence, and calculates the fractional frequency offset of the first signal according to the first offset.

Specifically, the fractional frequency offset b1 of the first signal may be obtained through calculation by using the following formula:

$$b1 = u \times \text{offset}_1 \times B/L,$$

where u is a root index of the special ZC sequence corresponding to the first signal, and $\text{offset}_1$ is the first offset. When $\text{offset}_1$ is a positive value, it indicates that the first maximum correlation peak shifts right relative to the starting location of the first synchronization sequence, or when $\text{offset}_1$ is a negative value, it indicates that the first maximum correlation peak shifts left relative to the starting location of the first synchronization sequence. B is the signal bandwidth of the first signal, and L is a length of the first synchronization sequence.

Preferably, after obtaining the integer frequency offset and the fractional frequency offset of the first signal through calculation, the receive end device may further obtain a cell identity of a serving cell, for use in subsequent signal processing. That the receive end device obtains the cell identity of the serving cell includes the following steps.

610. The receive end device determines a check characteristic sequence corresponding to the first maximum correlation peak as a characteristic sequence, and determines a first quantity of check digits corresponding to the first maximum correlation peak as a first quantity of digits.

The first synchronization sequence is obtained by performing dot multiplication or conjugate multiplication on the characteristic sequence and a sequence obtained after the special ZC sequence is cyclically shifted by the first quantity of digits. Therefore, a maximum peak value can be obtained only by de-characterizing the first synchronization sequence by using the characteristic sequence, and then performing sliding correlation on the de-characterized first synchronization sequence by using the sequence obtained after the special ZC sequence is cyclically shifted by the first quantity of digits. Therefore, the receive end device determines the check characteristic sequence corresponding to the first maximum correlation peak as the characteristic sequence, and determines the first quantity of check digits corresponding to the first maximum correlation peak as the first quantity of digits.

611. The receive end device determines a cell identity of a serving cell according to the characteristic sequence and/or the first quantity of digits.

Because the characteristic sequence and/or the first quantity of digits are/is corresponding to the cell identity of the serving cell, after determining the characteristic sequence and the first quantity of digits, the receive end device may determine the cell identity of the serving cell according to a correspondence between the characteristic sequence and/or the first quantity of digits and the cell identity. After determining the cell identity of the serving cell, the receive end device may use the cell identity of the serving cell in a subsequent signal processing process.

In this embodiment, a receive end device receives a first signal sent by a transmit end device, determines an integer frequency offset and a fractional frequency offset of the first signal, and determines a cell identity of a serving cell. Steps 602 to 608 are a specific method for determining the integer frequency offset of the first signal, step 609 is a specific method for determining the fractional frequency offset of the first signal, and steps 610 and 611 are a specific method for determining the cell identity of the serving cell. Because a first synchronization sequence included in the first signal received by the receive end device in this embodiment of the present disclosure is obtained after a special ZC sequence is cyclically shifted by a first quantity of digits and then dot multiplication or conjugate multiplication is performed on the cyclically shifted special ZC sequence and the characteristic sequence, the receive end device may distinguish different cells by using different characteristic sequences, and/or distinguish different cells by using different quantities of digits of cyclic shifts of a ZC sequence with a root index being +1 or −1, so that root indexes of ZC sequences in signals of the different cells received by the receive end device do not need to be different values, thereby implementing signal synchronization in an M2M technology by using the ZC sequence with a root index being +1 or −1.

Preferably, in some scenarios of actual application, for example, when the receive end device is a base station, the receive end device may directly learn the cell identity of the serving cell. In this way, steps 610 and 611 may be omitted. In addition, because the characteristic sequence and/or the first quantity of digits are/is corresponding to the cell identity of the serving cell, the receive end device may determine the characteristic sequence and/or the first quantity of digits according to the cell identity of the serving cell and the correspondence between the characteristic sequence and/or the first quantity of digits and the cell identity. After the receive end device determines the characteristic sequence according to the cell identity of the serving cell, in step 603, the receive end device may directly de-characterize the first synchronization sequence by using the characteristic sequence. After the receive end device determines the first quantity of digits according to the cell identity of the serving cell, in step 605, the receive end device may directly perform sliding correlation on each first compensation sequence by using the sequence obtained after the special ZC sequence is cyclically shifted by the first quantity of digits. In such a method, a quantity of check sequence groups determined by the receive end device in step 602 can be reduced, and a quantity of times of cyclically performing steps 603 to 606 is reduced, thereby reducing performance consumption of the receive end device.

Figure 7:
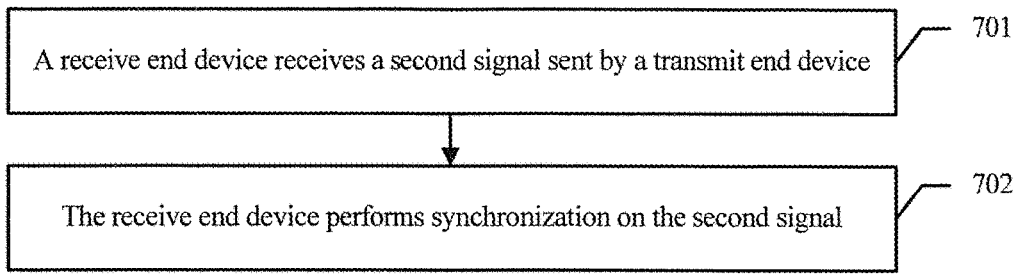
FIG. 7 is a flowchart of another embodiment of a synchronization signal receiving method according to an embodiment of the present disclosure.

The embodiments shown in FIG. 5, FIG. 6A, and FIG. 6B respectively provide the synchronization signal receiving methods corresponding to the embodiments shown in FIG. 1 and FIG. 2. The following embodiment provides a synchronization signal receiving method corresponding to the synchronization signal sending method shown in FIG. 3. Referring to FIG. 7, a basic procedure of the method includes the following steps.

701. A receive end device receives a second signal sent by a transmit end device.

The receive end device receives the second signal sent by the transmit end device, where the second signal includes a second synchronization sequence, the second synchronization sequence is a sequence obtained after a special ZC sequence is cyclically shifted by a second quantity of digits, the special ZC sequence is a ZC sequence with a root index being +1 or −1, the receive end device operates in a serving cell, and the second quantity of digits is corresponding to a cell identity of the serving cell.

702. The receive end device performs synchronization on the second signal.

After receiving the second signal, the receive end device performs synchronization on the second signal. A specific method for performing synchronization by the receive end device according to the second signal is described in detail in the following embodiment, and is not limited in this embodiment.

In this embodiment, a receive end device receives a second signal sent by a transmit end device, where the receive end device operates in a serving cell, the second signal includes a second synchronization sequence, the second synchronization sequence is a sequence obtained after a special ZC sequence is cyclically shifted by a second quantity of digits, the special ZC sequence is a ZC sequence with a root index being +1 or −1, and the second quantity of digits is corresponding to a cell identity of the serving cell; and the receive end device performs synchronization on the second signal. Because the second synchronization sequence included in the second signal received by the receive end device in this embodiment of the present disclosure is obtained after the special ZC sequence is cyclically shifted by the second quantity of digits, the receive end device may distinguish different cells by using different quantities of digits of cyclic shifts of the ZC sequence with a root index being +1 or −1, so that root indexes of ZC sequences in signals of the different cells received by the receive end device do not need to be different values, thereby implementing signal synchronization in an M2M technology by using the ZC sequence with a root index being +1 or −1.

Figure 8A:
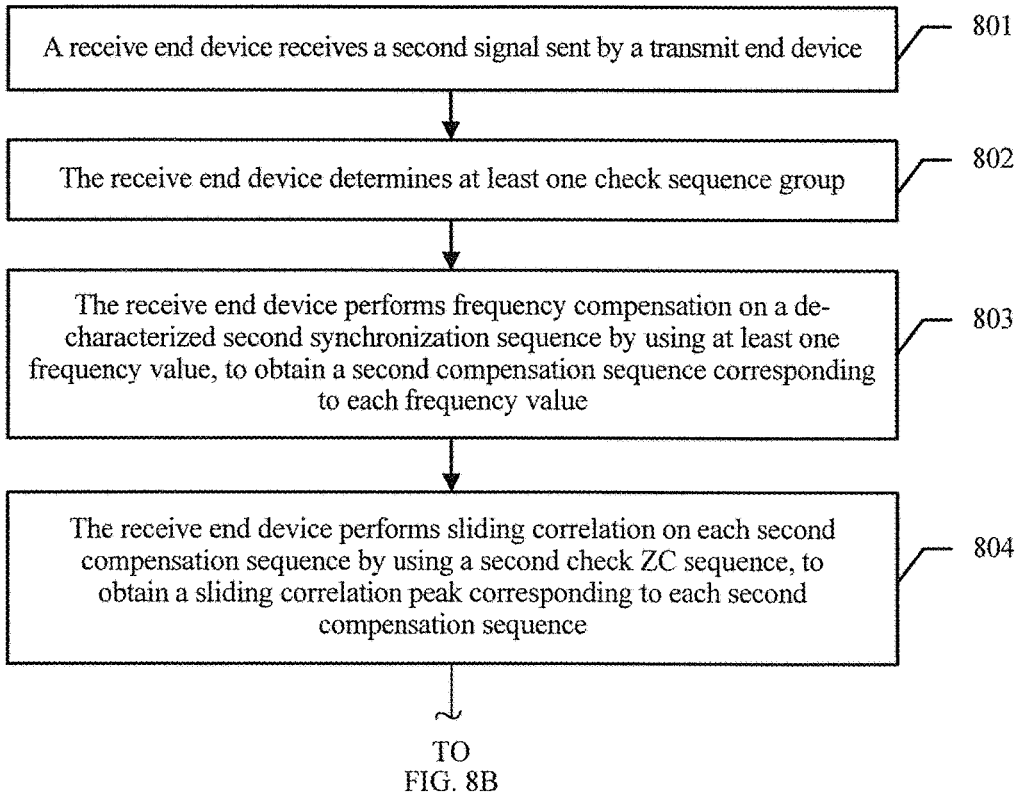
FIG. 8A and FIG. 8B are a flowchart of another embodiment of a synchronization signal receiving method according to an embodiment of the present disclosure.
Figure 8B:
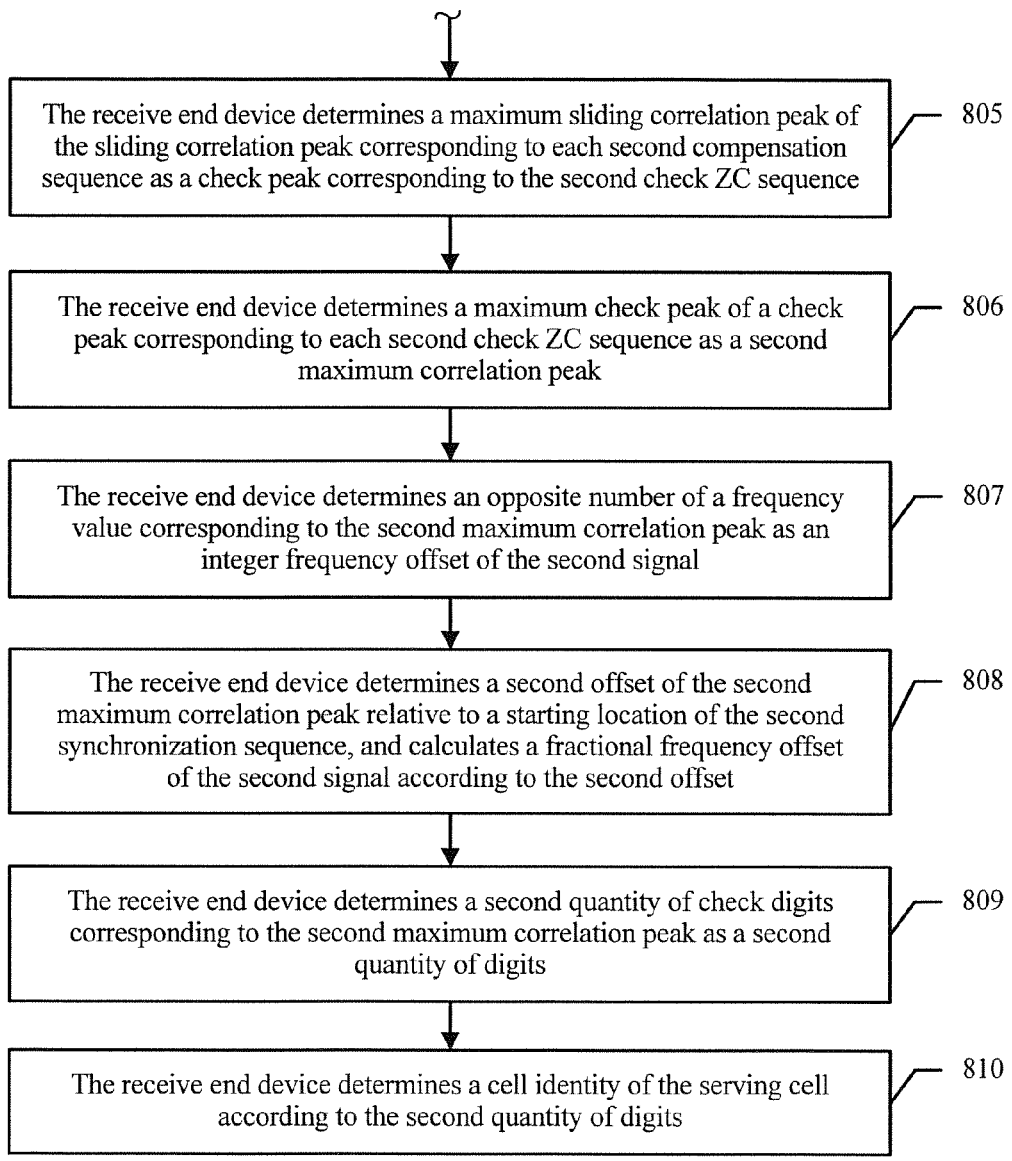

Generally, that the receive end device performs synchronization on the second signal mainly includes determining an integer frequency offset and a fractional frequency offset of the second signal. The following embodiment provides a relatively detailed description about a method for determining an integer frequency offset and a fractional frequency offset. Referring to FIG. 8A and FIG. 8B, a basic procedure of the method includes the following steps.

801. A receive end device receives a second signal sent by a transmit end device.

802. The receive end device determines at least one second check ZC sequence.

The receive end device determines the at least one second check ZC sequence. The second check ZC sequence comes from a cyclically shifted special ZC sequence that may be used by all cells in the communications system, and the second check ZC sequence is a sequence obtained after the special ZC sequence is cyclically shifted by a second quantity of check digits.

For each second check ZC sequence, the receive end device performs steps 803 to 805:

803. The receive end device performs frequency compensation on the second synchronization sequence by using at least one frequency value, to obtain a second compensation sequence corresponding to each frequency value.

Frequency compensation may be implemented by using many methods. For example, if it is assumed that a signal that needs to be compensated is $s_1, s_2, \ldots, s_n$, and a frequency offset value required for compensation is $\varepsilon$, a compensated sequence is $cs_1, cs_2, \ldots, cs_n$, where $cs_i = e^{j2\pi i \varepsilon / B} s_i$, ($i=1, \ldots, n$), and B is used to represent signal bandwidth.

Each frequency value used by the receive end device is an integer multiple of signal bandwidth of the second signal.

Preferably, the receive end device may determine, according to a maximum empirical value of a frequency offset in a communications system in which the receive end device is located, a value range of a frequency value used by a receive end for frequency compensation. For example, when the maximum empirical value of the frequency offset in the communications system is 2.7 B, the frequency value used by the receive end device for frequency compensation may be: −3 B, −2 B, −1 B, 0, 1 B, 2 B, or 3 B.

804. The receive end device performs sliding correlation on each second compensation sequence by using the second check ZC sequence, to obtain a sliding correlation peak corresponding to each second compensation sequence.

After obtaining the second compensation sequence corresponding to each frequency value, the receive end device performs sliding correlation on each second compensation sequence by using the second check ZC sequence, to obtain the sliding correlation peak corresponding to each second compensation sequence.

805. The receive end device determines a maximum sliding correlation peak of the sliding correlation peak corresponding to each second compensation sequence as a check peak corresponding to the second check ZC sequence.

After steps 803 to 805 are performed for all second check ZC sequences, step 806 is performed.

806. The receive end device determines a maximum check peak of a check peak corresponding to each second check ZC sequence as a second maximum correlation peak.

After performing steps 803 to 805 for all the second check ZC sequences, the receive end device obtains check peaks corresponding to all the second check ZC sequences. The receive end device determines a maximum check peak of the check peaks as the second maximum correlation peak.

807. The receive end device determines an opposite number of a frequency value corresponding to the second maximum correlation peak as an integer frequency offset of the second signal.

After determining the second maximum correlation peak, the receive end device determines the opposite number of the frequency value corresponding to the second maximum correlation peak as the integer frequency offset of the second signal.

808. The receive end device determines a second offset of the second maximum correlation peak relative to a starting location of the second synchronization sequence, and calculates a fractional frequency offset of the second signal according to the second offset.

Specifically, the fractional frequency offset b2 of the second signal may be obtained through calculation by using the following formula:

$$b2 = u \times \text{offset}_2 \times B/L, \text{ where}$$

u is a root index of the special ZC sequence corresponding to the second signal, and $\text{offset}_2$ is the second offset. When $\text{offset}_2$ is a positive value, it indicates that the second maximum correlation peak shifts right relative to the starting location of the second synchronization sequence, or when $\text{offset}_2$ is a negative value, it indicates that the second maximum correlation peak shifts left relative to the starting location of the second synchronization sequence. B is the signal bandwidth of the second signal, and L is a length of the second synchronization sequence.

Preferably, after obtaining the integer frequency offset and the fractional frequency offset of the second signal through calculation, the receive end device may further obtain a cell identity of a serving cell, for use in subsequent signal processing. That the receive end device obtains the cell identity of the serving cell includes the following steps.

809. The receive end device determines a second quantity of check digits corresponding to the second maximum correlation peak as a second quantity of digits.

The second synchronization sequence is a sequence obtained after the special ZC sequence is cyclically shifted by the second quantity of digits. Therefore, a maximum peak value can be obtained only by performing sliding correlation on the second synchronization sequence by using the sequence obtained after the special ZC sequence is cyclically shifted by the second quantity of digits. Therefore, the receive end device determines the second quantity of check digits corresponding to the second maximum correlation peak as the second quantity of digits.

810. The receive end device determines a cell identity of the serving cell according to the second quantity of digits.

Because the second quantity of digits is corresponding to the cell identity of the serving cell, after determining the second quantity of digits, the receive end device may determine the cell identity of the serving cell according to a correspondence between the second quantity of digits and the cell identity. After determining the cell identity of the serving cell, the receive end device may use the cell identity of the serving cell in a subsequent signal processing process.

In this embodiment, a receive end device receives a second signal sent by a transmit end device, determines an integer frequency offset and a fractional frequency offset of the second signal, and determines a cell identity of a serving cell. Steps 802 to 807 are a specific method for determining the integer frequency offset of the second signal, step 808 is a specific method for determining the fractional frequency offset of the second signal, steps 809 and 810 are a specific method for determining the cell identity of the serving cell. Because a second synchronization sequence included in the second signal received by the receive end device in this embodiment of the present disclosure is obtained after a special ZC sequence is cyclically shifted by a second quantity of digits, the receive end device may distinguish different cells by using different quantities of digits of cyclic shifts of a ZC sequence with a root index being +1 or −1, so that root indexes of ZC sequences in signals of the different cells received by the receive end device do not need to be different values, thereby implementing signal synchronization in an M2M technology by using the ZC sequence with a root index being +1 or −1.

Preferably, in some scenarios of actual application, for example, when the receive end device is a base station, the receive end device may directly learn the cell identity of the serving cell. In this way, steps 809 and 810 may be omitted. In addition, because the second quantity of digits is corresponding to the cell identity of the serving cell, the receive end device may determine the second quantity of digits according to the cell identity of the serving cell and the correspondence between the second quantity of digits and the cell identity. After the receive end device determines the second quantity of digits according to the cell identity of the serving cell, in step 802, the receive end device may directly use a special ZC sequence that is cyclically shifted by the second quantity of digits as the second check ZC sequence. In such a method, a quantity of second check ZC sequences determined by the receive end device in step 802 can be reduced, and a quantity of times of cyclically performing steps 803 to 805 is reduced, thereby reducing performance consumption of the receive end device.

For ease of understanding the foregoing embodiments, description is provided below by using a specific application scenario of the foregoing embodiments as an example.

In a serving cell, a base station performs M2M communication with UE.

The base station determines a cell identity of the serving cell, and determines, according to the cell identity of the serving cell, that a characteristic sequence is a pseudo-random sequence using the cell identity of the serving cell as a seed; and determines that a first quantity of digits is 0. Because the first quantity of digits is 0, the base station directly performs dot multiplication on a ZC sequence with a root index of 1 and the pseudo-random sequence, to obtain a first synchronization sequence, and sends a first signal including the first synchronization sequence to the UE.

A signal received by the UE is the first signal. Compared with the first signal, the signal received by the UE has a frequency offset, and the first signal includes the first synchronization sequence. The UE determines ten check sequence groups, where each check sequence group includes a pseudo-random sequence using different cell identities as seeds and the ZC sequence with a root index of 1.

For each check sequence group, the UE executes the following operations: performing conjugate multiplication on the first synchronization sequence and the pseudo-random sequence in the check sequence group; then, performing frequency compensation on a de-characterized first synchronization sequence by using at least one frequency value, to obtain a first compensation sequence corresponding to each frequency value; performing sliding correlation on each first compensation sequence by using the ZC sequence with a root index of 1, to obtain a sliding correlation peak corresponding to each first compensation sequence; and determining that a maximum sliding correlation peak of the sliding correlation peak corresponding to each first compensation sequence is a check peak corresponding to the check sequence group. Because there are ten check sequence groups in total, a total of ten check peaks may be obtained.

The UE determines a maximum check peak of the ten check peaks as a first maximum correlation peak, determines a frequency value corresponding to the first maximum correlation peak as an integer frequency offset of the first signal, and determines a first offset of the first maximum correlation peak relative to a starting location of the first synchronization sequence as a fractional frequency offset of the first signal.

The UE determines a seed of a pseudo-random sequence in a check sequence group corresponding to the first maximum correlation peak, and determines the seed as the cell identity of the serving cell.

The foregoing embodiments describe the synchronization signal sending method and the synchronization signal receiving method provided in the present disclosure, and the following embodiments provide a corresponding transmit end device and a corresponding receive end device, to implement the methods in the foregoing embodiments.

Figure 9:
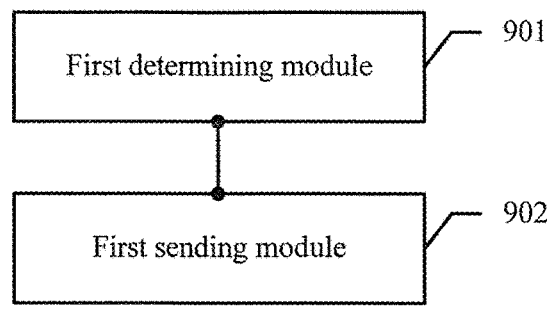
FIG. 9 is a structural diagram of an embodiment of a transmit end device according to an embodiment of the present disclosure.

Referring to FIG. 9, a basic structure of a transmit end device provided in an embodiment of the present disclosure mainly includes a first determining module 901 and a first sending module 902.

The first determining module 901 is configured to determine a first signal.

The first determining module 901 is configured to determine the first signal, where the transmit end device operates in a serving cell, the first signal includes a first synchronization sequence, the first synchronization sequence is a sequence obtained after a special ZC sequence is cyclically shifted by a first quantity of digits and then dot multiplication or conjugate multiplication is performed on the cyclically shifted special ZC sequence and the characteristic sequence, the characteristic sequence is used to distinguish the serving cell from another cell, and the characteristic sequence and/or the first quantity of digits are/is corresponding to a cell identity of the serving cell.

The special ZC sequence is a ZC sequence with a root index being +1 or −1, and a general formula of the special ZC sequence is $Z(n)=e^{-j\pi n(n+1+2q)/L}$ or $Z(n)=e^{j\pi n(n+1+2q)/L}$, where q is used to represent any integer, L is used to represent a length of the special ZC sequence, and a value range of n is [0, L−1].

After the special ZC sequence is cyclically shifted by the first quantity of digits and then dot multiplication or conjugate multiplication is performed on the cyclically shifted special ZC sequence and the characteristic sequence, the first synchronization sequence is obtained. To distinguish different cells, different first synchronization sequences should be set for the cells. It may be understood that, the different first synchronization sequences may be set for the different cells provided that different characteristic sequences are set for the different cells and/or different quantities of digits of cyclic shifts of the special ZC sequence are set for the different cells. Therefore, in this embodiment, the characteristic sequence of the serving cell is corresponding to the cell identity of the serving cell, so that the characteristic sequence of the serving cell is different from a characteristic sequence of another cell; and/or, the first quantity of digits is corresponding to the cell identity of the serving cell, so that a quantity of digits of a cyclic shift of the special ZC sequence of the serving cell is different from that of another cell.

Because the cyclic shift includes a left shift and a right shift, a shift in any direction may be set to be positive. For ease of description, quantities of digits of all right shifts are positive values by default in this application. For example, a sequence A is [1, 2, 3, 4, 5, 6], when a quantity of digits of a cyclic shift is 2, the sequence A is changed to [5, 6, 1, 2, 3, 4] after the cyclic shift; and when a quantity of digits of a cyclic shift is −2, the sequence A is changed to [3, 4, 5, 6, 1, 2] after the cyclic shift. That the special ZC sequence is cyclically shifted by the first quantity of digits means: the special ZC sequence is cyclically shifted, and a quantity of digits of the cyclic shift is the first quantity of digits. The special ZC sequence is cyclically shifted by the first quantity of digits, and an absolute value of the first quantity of digits should be less than the length L of the special ZC sequence. That is, a value range of the first quantity of digits is any integer in (−L, L). It may be understood that, when the first quantity of digits is 0, the special ZC sequence is not cyclically shifted.

The first sending module 902 is configured to send the first signal to a receive end device, so that the receive end device performs synchronization according to the first signal.

In this embodiment, a first determining module 901 determines a first signal, where the transmit end device operates in a serving cell, the first signal includes a first synchronization sequence, the first synchronization sequence is a sequence obtained after a special ZC sequence is cyclically shifted by a first quantity of digits and then dot multiplication or conjugate multiplication is performed on the cyclically shifted special ZC sequence and the characteristic sequence, the special ZC sequence is a ZC sequence with a root index being +1 or −1, and the characteristic sequence and/or the first quantity of digits are/is corresponding to a cell identity of the serving cell; and a first sending module sends the first signal to a receive end device, so that the receive end device performs synchronization according to the first signal. Because the first synchronization sequence included in the first signal sent by the transmit end device in this embodiment of the present disclosure is obtained after the special ZC sequence is cyclically shifted by the first quantity of digits and then dot multiplication or conjugate multiplication is performed on the cyclically shifted special ZC sequence and the characteristic sequence, different cells may be distinguished by using different characteristic sequences, and/or distinguished by using different quantities of digits of cyclic shifts of the ZC sequence with a root index being +1 or −1, and a requirement of distinguishing the different cells may be met without setting root indexes of ZC sequences of the different cells to different values, thereby implementing signal synchronization in an M2M technology by using the ZC sequence with a root index being +1 or −1.

Figure 10:
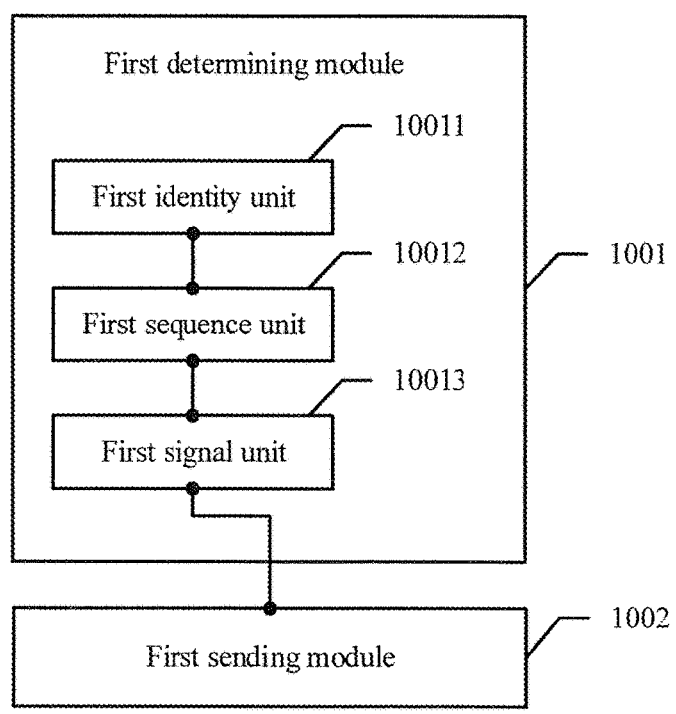
FIG. 10 is a structural diagram of another embodiment of a transmit end device according to an embodiment of the present disclosure.

The embodiment shown in FIG. 9 provides the basic structure of the transmit end device provided in the present disclosure. The following embodiment provides a specific structure of the first determining module in the transmit end device. Referring to FIG. 10, a basic structure of another transmit end device provided in an embodiment of the present disclosure includes a first determining module 1001 and a first sending module 1002.

The first determining module 1001 is configured to determine a first signal. In this embodiment, the first determining module 1001 specifically includes a first identity unit 10011, a first sequence unit 10012, and a first signal unit 10013.

The first identity unit 10011 is configured to determine a cell identity of the serving cell.

The first sequence unit 10012 is configured to determine the characteristic sequence and/or the first quantity of digits according to the cell identity of the serving cell.

At least one of the characteristic sequence or the first quantity of digits is corresponding to the cell identity of the serving cell. Details are as follows:

If the characteristic sequence is corresponding to the cell identity of the serving cell, the first quantity of digits of the serving cell is the same as those of multiple other cells, and a transmit end already knows the first quantity of digits, the transmit end device determines the characteristic sequence according to the cell identity of the serving cell and a correspondence between the characteristic sequence and the cell identity of the serving cell.

If both the characteristic sequence and the first quantity of digits are corresponding to the cell identity of the serving cell, the transmit end device determines the characteristic sequence and the first quantity of digits according to the cell identity of the serving cell and a correspondence between the cell identity of the serving cell and each of the characteristic sequence and the first quantity of digits.

The first signal unit 10013 is configured to determine the first signal according to the characteristic sequence and/or the first quantity of digits.

The first signal unit 10013 determines a first synchronization sequence and the first signal according to the characteristic sequence and/or the first quantity of digits. Specifically, the first signal unit 10013 determines that a sequence obtained after a special ZC sequence is cyclically shifted by the first quantity of digits and then dot multiplication or conjugate multiplication is performed on the cyclically shifted special ZC sequence and the characteristic sequence is the first synchronization sequence, and determines the first signal including the first synchronization sequence.

The first sending module 1002 is configured to send the first signal to a receive end device, so that the receive end device performs synchronization according to the first signal.

In this embodiment, a first identity unit 10011 determines a cell identity of a serving cell; a first sequence unit 10012 determines a characteristic sequence and/or a first quantity of digits according to the cell identity of the serving cell; a first signal unit 10013 determines a first synchronization sequence and a first signal according to the characteristic sequence and/or the first quantity of digits; and a first sending module 1002 sends the first signal to a receive end device, so that the receive end device performs synchronization according to the first signal. Because the first synchronization sequence included in the first signal sent by the transmit end device in this embodiment of the present disclosure is obtained after a special ZC sequence is cyclically shifted by the first quantity of digits and then dot multiplication or conjugate multiplication is performed on the cyclically shifted special ZC sequence and the characteristic sequence, different cells may be distinguished by using different characteristic sequences, and/or distinguished by using different quantities of digits of cyclic shifts of a ZC sequence with a root index being +1 or −1, and a requirement of distinguishing the different cells may be met without setting root indexes of ZC sequences of the different cells to different values, thereby implementing signal synchronization in an M2M technology by using the ZC sequence with a root index being +1 or −1.

There are many types of characteristic sequences, including a pseudo-random sequence, a Walsh sequence, a Hadamard sequence, a Gold sequence, or a ZC sequence, and are not limited herein.

Particularly, if the characteristic sequence is a pseudo-random sequence or a Gold sequence, the corresponding pseudo-random sequence or the corresponding Gold sequence may be generated by using the cell identity of the serving cell as an initial seed, so that the characteristic sequence corresponds to the cell identity of the serving cell.

Figure 11:
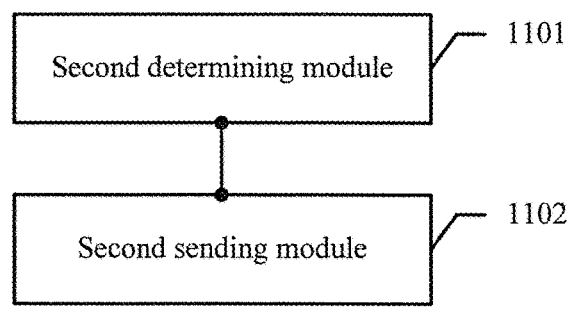
FIG. 11 is a structural diagram of another embodiment of a transmit end device according to an embodiment of the present disclosure.

The embodiments shown in FIG. 9 and FIG. 10 provide the basic structures of the transmit end devices provided in the embodiments of the present disclosure, and the transmit end devices distinguish different cells by cyclically shifting the special ZC sequence by the first quantity of digits and then performing dot multiplication or conjugate multiplication on the cyclically shifted special ZC sequence and the characteristic sequence. The following embodiment provides a new transmit end device, to distinguish different cells in another manner. Referring to FIG. 11, a basic structure of another transmit end device provided in an embodiment of the present disclosure includes a second determining module 1101 and a second sending module 1102.

The second determining module 1101 is configured to determine a second signal, where the second signal includes a second synchronization sequence, the second synchronization sequence is a sequence obtained after a special ZC sequence is cyclically shifted by a second quantity of digits, the special ZC sequence is a ZC sequence with a root index being +1 or −1, the transmit end device operates in a serving cell, and the second quantity of digits is corresponding to a cell identity of the serving cell.

After the special ZC sequence is cyclically shifted by the second quantity of digits, the second synchronization sequence is obtained. To distinguish different cells, different second synchronization sequences should be set for the cells. It may be understood that, the different second synchronization sequences may be set for the different cells provided that different quantities of digits of cyclic shifts of the special ZC sequence are set for the different cells. Therefore, in this embodiment, the second quantity of digits is corresponding to the cell identity of the serving cell, so that a quantity of digits of a cyclic shift of the special ZC sequence of the serving cell is different from that of another cell.

The second sending module 1102 is configured to send the second signal to a receive end device, so that the receive end device performs synchronization according to the second signal.

In this embodiment, a second determining module 1101 determines a second signal, where the second signal includes a second synchronization sequence, the second synchronization sequence is a sequence obtained after a special ZC sequence is cyclically shifted by a second quantity of digits, the special ZC sequence is a ZC sequence with a root index being +1 or −1, the transmit end device operates in a serving cell, and the second quantity of digits is corresponding to a cell identity of the serving cell; and a second sending module 1102 sends the second signal to a receive end device, so that the receive end device performs synchronization according to the second signal. Because the second synchronization sequence included in the second signal sent by the transmit end device in this embodiment of the present disclosure is obtained after the special ZC sequence is cyclically shifted by the second quantity of digits, different cells may be distinguished by using different quantities of digits of cyclic shifts of the ZC sequence with a root index being +1 or −1, and a requirement of distinguishing the different cells may be met without setting root indexes of ZC sequences of the different cells to different values, thereby implementing signal synchronization in an M2M technology by using the ZC sequence with a root index being +1 or −1.

Figure 12:
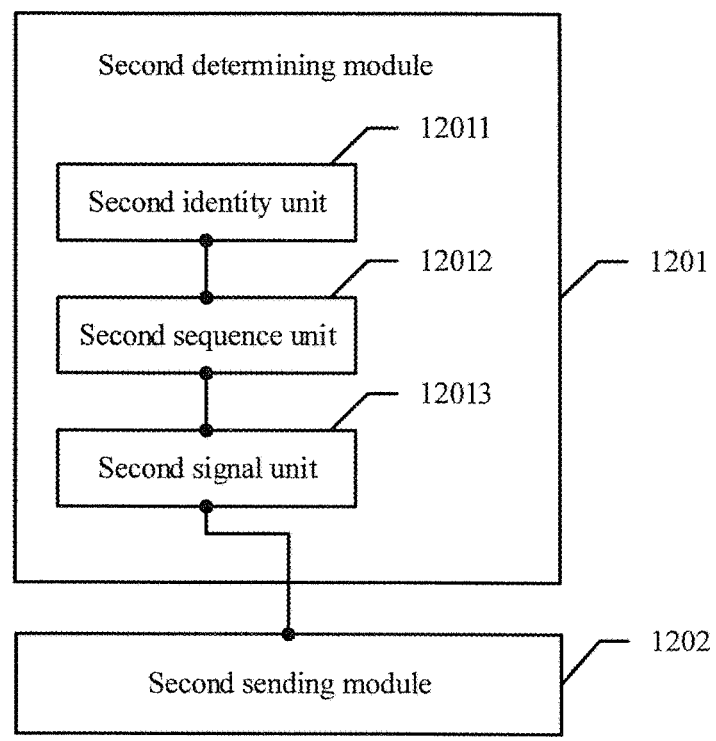
FIG. 12 is a structural diagram of another embodiment of a transmit end device according to an embodiment of the present disclosure.

The embodiment shown in FIG. 11 provides the basic structure of another transmit end device provided in the present disclosure. The following embodiment provides a basic structure of the second determining module in the transmit end device. Referring to FIG. 12, a basic structure of another transmit end device provided in an embodiment of the present disclosure includes a second determining module 1201 and a second sending module 1202.

The second determining module 1201 is configured to determine a second signal. In this embodiment, the second determining module 1201 specifically includes a second identity unit 12011, a second sequence unit 12012, and a second signal unit 12013.

The second identity unit 12011 determines a cell identity of the serving cell.

The second sequence unit 12012 determines the second quantity of digits according to the cell identity of the serving cell.

The second quantity of digits is corresponding to the cell identity of the serving cell. In this embodiment, after the cell identity of the serving cell is determined, the second sequence unit 12012 determines the second quantity of digits according to the cell identity of the serving cell and a correspondence between the second quantity of digits and the cell identity.

The second signal unit 12013 determines the second signal according to the second quantity of digits.

The second signal unit 12013 determines the second signal according to the second quantity of digits. Specifically, the second signal unit 12013 determines that a sequence obtained after a special ZC sequence is cyclically shifted by the second quantity of digits is a second synchronization sequence, and determines the second signal including the second synchronization sequence.

The second sending module 1202 is configured to send the second signal to a receive end device, so that the receive end device performs synchronization according to the second signal.

In this embodiment, a second identity unit 12011 determines a cell identity of a serving cell; a second sequence unit 12012 determines a second quantity of digits according to the cell identity of the serving cell; a second signal unit 12013 determines a second synchronization sequence and a second signal according to the second quantity of digits; and a second sending module 1202 sends the second signal to a receive end device, so that the receive end device performs synchronization according to the second signal. Because the second synchronization sequence included in the second signal sent by the transmit end device in this embodiment of the present disclosure is obtained after a special ZC sequence is cyclically shifted by the second quantity of digits, different cells may be distinguished by using different quantities of digits of cyclic shifts of a ZC sequence with a root index being +1 or −1, and a requirement of distinguishing the different cells may be met without setting root indexes of ZC sequences of the different cells to different values, thereby implementing signal synchronization in an M2M technology by using the ZC sequence with a root index being +1 or −1.

Figure 13:
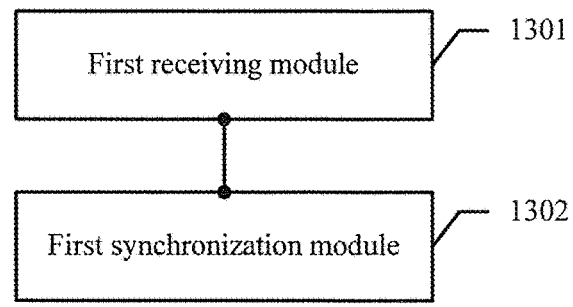
FIG. 13 is a structural diagram of an embodiment of a receive end device according to an embodiment of the present disclosure.

The embodiments shown in FIG. 9 to FIG. 12 explain in detail the structures of the transmit end devices provided in the embodiments of the present disclosure. The following embodiment provides a corresponding receive end device. Referring to FIG. 13, a basic structure of the receive end device includes a first receiving module 1301 and a first synchronization module 1302.

The first receiving module 1301 is configured to receive a first signal sent by a transmit end device, where the receive end device operates in a serving cell, the first signal includes a first synchronization sequence, the first synchronization sequence is a sequence obtained after a special ZC sequence is cyclically shifted by a first quantity of digits and then dot multiplication or conjugate multiplication is performed on the cyclically shifted special ZC sequence and the characteristic sequence, the special ZC sequence is a ZC sequence with a root index being +1 or −1, the characteristic sequence and/or the first quantity of digits are/is corresponding to a cell identity of the serving cell, and the characteristic sequence is used to distinguish the serving cell from another cell.

The first synchronization module 1302 is configured to perform synchronization on the first signal.

In this embodiment, a first receiving module 1301 receives a first signal sent by a transmit end device, where the receive end device operates in a serving cell, the first signal includes a first synchronization sequence, the first synchronization sequence is a sequence obtained after a special ZC sequence is cyclically shifted by a first quantity of digits and then dot multiplication or conjugate multiplication is performed on the cyclically shifted special ZC sequence and the characteristic sequence, the special ZC sequence is a ZC sequence with a root index being +1 or −1, and the characteristic sequence and/or the first quantity of digits are/is corresponding to a cell identity of the serving cell; and a first synchronization module 1302 performs synchronization on the first signal. Because the first synchronization sequence included in the first signal received by the receive end device in this embodiment of the present disclosure is obtained after the special ZC sequence is cyclically shifted by the first quantity of digits and then dot multiplication or conjugate multiplication is performed on the cyclically shifted special ZC sequence and the characteristic sequence, the receive end device may distinguish different cells by using different characteristic sequences, and/or distinguish different cells by using different quantities of digits of cyclic shifts of the ZC sequence with a root index being +1 or −1, so that root indexes of ZC sequences in signals of the different cells received by the receive end device do not need to be different values, thereby implementing signal synchronization in an M2M technology by using the ZC sequence with a root index being +1 or −1.

Figure 14:
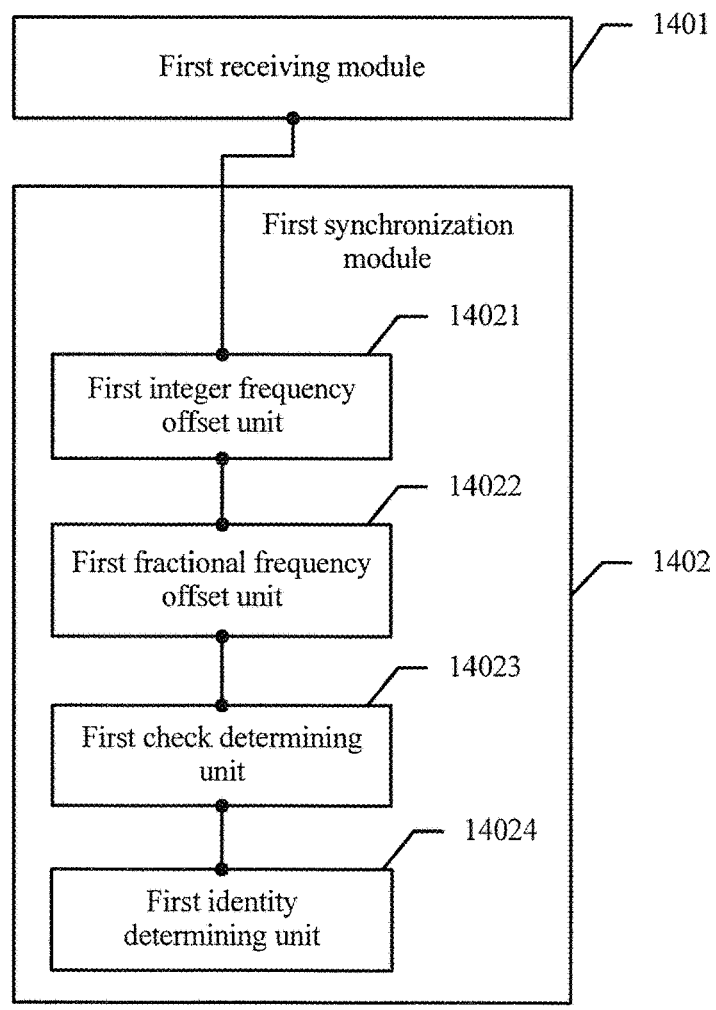
FIG. 14 is a structural diagram of another embodiment of a receive end device according to an embodiment of the present disclosure.

Generally, that the receive end device performs synchronization on the first signal mainly includes determining an integer frequency offset and a fractional frequency offset of the first signal. The following embodiment provides a relatively detailed description about a receive end device that can determine an integer frequency offset and a fractional frequency offset. Referring to FIG. 14, a basic structure of the receive end device includes a first receiving module 1401 and a first synchronization module 1402.

The first receiving module 1401 is configured to receive a first signal sent by a transmit end device, where the receive end device operates in a serving cell, the first signal includes a first synchronization sequence, the first synchronization sequence is a sequence obtained after a special ZC sequence is cyclically shifted by a first quantity of digits and then dot multiplication or conjugate multiplication is performed on the cyclically shifted special ZC sequence and the characteristic sequence, the special ZC sequence is a ZC sequence with a root index being +1 or −1, the characteristic sequence and/or the first quantity of digits are/is corresponding to a cell identity of the serving cell, and the characteristic sequence is used to distinguish the serving cell from another cell.

The first synchronization module 1402 is configured to perform synchronization on the first signal. In this embodiment, the first synchronization module 1402 specifically includes a first integer frequency offset unit 14021 and a first fractional frequency offset unit 14022.

The first integer frequency offset unit 14021 is configured to determine an integer frequency offset of the first signal.

There are many methods for determining the integer frequency offset of the first signal by the first integer frequency offset unit 14021. An example is as follows:

The first integer frequency offset unit 14021 determines at least one check sequence group, where each check sequence group comes from a combination of a characteristic sequence and a cyclically shifted special ZC sequence that may be used by all cells in the communications system. The characteristic sequence in each check sequence group is referred to as a check characteristic sequence, the cyclically shifted special ZC sequence in each check characteristic group is referred to as a first check ZC sequence, and a cyclic shift value of the first check ZC sequence is a first quantity of check digits.

For each check sequence group, the first integer frequency offset unit 14021 executes the following operations: de-characterizing the first synchronization sequence by using the check characteristic sequence in the check sequence group; performing frequency compensation on the de-characterized first synchronization sequence by using at least one frequency value, to obtain a first compensation sequence corresponding to each frequency value; performing sliding correlation on each first compensation sequence by using the first check ZC sequence, to obtain a sliding correlation peak corresponding to each first compensation sequence; and determining a maximum sliding correlation peak of the sliding correlation peak corresponding to each first compensation sequence as a check peak corresponding to the check sequence group;

determining a maximum check peak of the check peak corresponding to each check sequence group as a first maximum correlation peak; and determining an opposite number of a frequency value corresponding to the first maximum correlation peak as the integer frequency offset of the first signal.

The first integer frequency offset unit 14021 de-characterizes the first synchronization sequence by using the check characteristic sequence in the check sequence group. A de-characterizing method is corresponding to the first synchronization sequence. For example, if the first synchronization sequence is obtained after the special ZC sequence is cyclically shifted by the first quantity of digits and then dot multiplication is performed on the cyclically shifted special ZC sequence and the characteristic sequence, the first integer frequency offset unit 14021 performs de-characterizing by performing conjugate multiplication on the check characteristic sequence and the first synchronization sequence; or if the first synchronization sequence is obtained after the special ZC sequence is cyclically shifted by the first quantity of digits and then conjugate multiplication is performed on the cyclically shifted special ZC sequence and the characteristic sequence, the first integer frequency offset unit 14021 performs de-characterizing by performing dot multiplication on the check characteristic sequence and the first synchronization sequence.

Each frequency value used by the first integer frequency offset unit 14021 is an integer multiple of signal bandwidth of the first signal. Preferably, the receive end device may determine, according to a maximum empirical value of a frequency offset in a communications system in which the receive end device is located, a value range of a frequency value used by a receive end for frequency compensation. For example, when the maximum empirical value of the frequency offset in the communications system is 2.7 B, the frequency value used by the receive end device for frequency compensation may be: −3 B, −2 B, −1 B, 0, 1 B, 2 B, or 3 B.

The first fractional frequency offset unit 14022 is configured to determine a fractional frequency offset of the first signal. There are many methods for determining the fractional frequency offset of the first signal by the first fractional frequency offset unit 14022. An example is as follows:

The first fractional frequency offset unit 14022 determines a first offset of the first maximum correlation peak relative to a starting location of the first synchronization sequence, and calculates the fractional frequency offset of the first signal according to the first offset.

Specifically, the fractional frequency offset b1 of the first signal may be obtained through calculation by using the following formula:

$$b1 = u \times \text{offset}_1 \times B/L,$$

where u is a root index of the special ZC sequence corresponding to the first signal, and $\text{offset}_1$ is the first offset. When $\text{offset}_1$ is a positive value, it indicates that the first maximum correlation peak shifts right relative to the starting location of the first synchronization sequence, or when $\text{offset}_1$ is a negative value, it indicates that the first maximum correlation peak shifts left relative to the starting location of the first synchronization sequence. B is the signal bandwidth of the first signal, and L is a length of the first synchronization sequence.

Preferably, in this embodiment, the first synchronization module 1402 may further include a first check determining unit 14023 and a first identity determining unit 14024.

The first check determining unit 14023 is configured to: determine a check characteristic sequence corresponding to the first maximum correlation peak as the characteristic sequence, and determine a first quantity of check digits corresponding to the first maximum correlation peak as the first quantity of digits.

The first synchronization sequence is obtained by performing dot multiplication or conjugate multiplication on the characteristic sequence and a special ZC sequence that is cyclically shifted by the first quantity of digits. Therefore, a maximum peak value can be obtained only by de-characterizing the first synchronization sequence by using the characteristic sequence, and then performing sliding correlation on the de-characterized first synchronization sequence by using the special ZC sequence that is cyclically shifted by the first quantity of digits. Therefore, the first check determining unit 14023 determines the check characteristic sequence corresponding to the first maximum correlation peak as the characteristic sequence, and determines the first quantity of check digits corresponding to the first maximum correlation peak as the first quantity of digits.

The first identity determining unit 14024 is configured to determine the cell identity of the serving cell according to the characteristic sequence and/or the first quantity of digits.

Because the characteristic sequence and/or the first quantity of digits are/is corresponding to the cell identity of the serving cell, after the characteristic sequence and the first quantity of digits are determined, the first identity determining unit 14024 may determine the cell identity of the serving cell according to a correspondence between the characteristic sequence and/or the first quantity of digits and the cell identity. After determining the cell identity of the serving cell, the receive end device may use the cell identity of the serving cell in a subsequent signal processing process.

In this embodiment, a first receiving module 1401 receives a first signal sent by a transmit end device, a first integer frequency offset unit 14021 determines an integer frequency offset of the first signal, a first fractional frequency offset unit 14022 determines a fractional frequency offset of the first signal, and a first identity determining unit 14024 determines a cell identity of a serving cell. Because a first synchronization sequence included in the first signal received by the receive end device in this embodiment of the present disclosure is obtained after a special ZC sequence is cyclically shifted by a first quantity of digits and then dot multiplication or conjugate multiplication is performed on the cyclically shifted special ZC sequence and the characteristic sequence, the receive end device may distinguish different cells by using different characteristic sequences, and/or distinguish different cells by using different quantities of digits of cyclic shifts of a ZC sequence with a root index being +1 or −1, so that root indexes of ZC sequences in signals of the different cells received by the receive end device do not need to be different values, thereby implementing signal synchronization in an M2M technology by using the ZC sequence with a root index being +1 or −1.

Preferably, in some scenarios of actual application, for example, when the receive end device is a base station, the receive end device may directly learn the cell identity of the serving cell. In this way, the first check determining unit 14023 and the first identity determining unit 14024 may be omitted. In addition, because the characteristic sequence and/or the first quantity of digits are/is corresponding to the cell identity of the serving cell, the receive end device may determine the characteristic sequence and/or the first quantity of digits according to the cell identity of the serving cell and the correspondence between the characteristic sequence and/or the first quantity of digits and the cell identity. After the receive end device determines the characteristic sequence according to the cell identity of the serving cell, the receive end device may directly de-characterize the first synchronization sequence by using the characteristic sequence. After the receive end device determines the first quantity of digits according to the cell identity of the serving cell, the receive end device may directly perform sliding correlation on each first compensation sequence by using the special ZC sequence that is cyclically shifted by the first quantity of digits. In such a method, a quantity of check sequence groups determined by the receive end device can be reduced, thereby reducing performance consumption of the receive end device.

Figure 15:
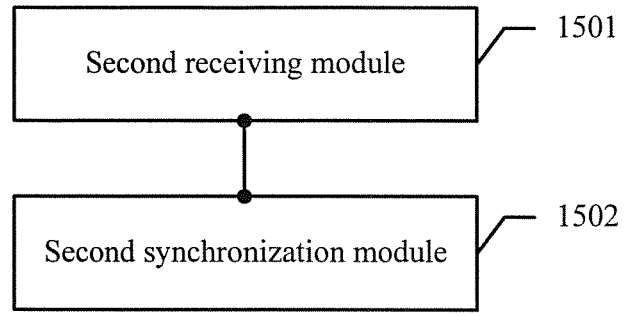
FIG. 15 is a structural diagram of another embodiment of a receive end device according to an embodiment of the present disclosure.

The embodiments shown in FIG. 13 and FIG. 14 respectively provide the receive end devices corresponding to the embodiments shown in FIG. 9 and FIG. 10. The following embodiment provides a receive end device corresponding to the transmit end device shown in FIG. 11. Referring to FIG. 15, a basic structure of the receive end device includes a second receiving module 1501 and a second synchronization module 1502.

The second receiving module 1501 is configured to receive a second signal sent by a transmit end device. The receive end device receives the second signal sent by the transmit end device.

The second signal includes a second synchronization sequence, the second synchronization sequence is a sequence obtained after a special ZC sequence is cyclically shifted by a second quantity of digits, the special ZC sequence is a ZC sequence with a root index being +1 or −1, the receive end device operates in a serving cell, and the second quantity of digits is corresponding to a cell identity of the serving cell.

The second synchronization module 1502 is configured to perform synchronization on the second signal.

In this embodiment, a second receiving module 1501 receives a second signal sent by a transmit end device, where the receive end device operates in a serving cell, the second signal includes a second synchronization sequence, the second synchronization sequence is a sequence obtained after a special ZC sequence is cyclically shifted by a second quantity of digits, the special ZC sequence is a ZC sequence with a root index being +1 or −1, and the second quantity of digits is corresponding to a cell identity of the serving cell; and a second synchronization module 1502 performs synchronization on the second signal. Because the second synchronization sequence included in the second signal received by the receive end device in this embodiment of the present disclosure is obtained after the special ZC sequence is cyclically shifted by the second quantity of digits, the receive end device may distinguish different cells by using different quantities of digits of cyclic shifts of the ZC sequence with a root index being +1 or −1, so that root indexes of ZC sequences in signals of the different cells received by the receive end device do not need to be different values, thereby implementing signal synchronization in an M2M technology by using the ZC sequence with a root index being +1 or −1.

Figure 16:
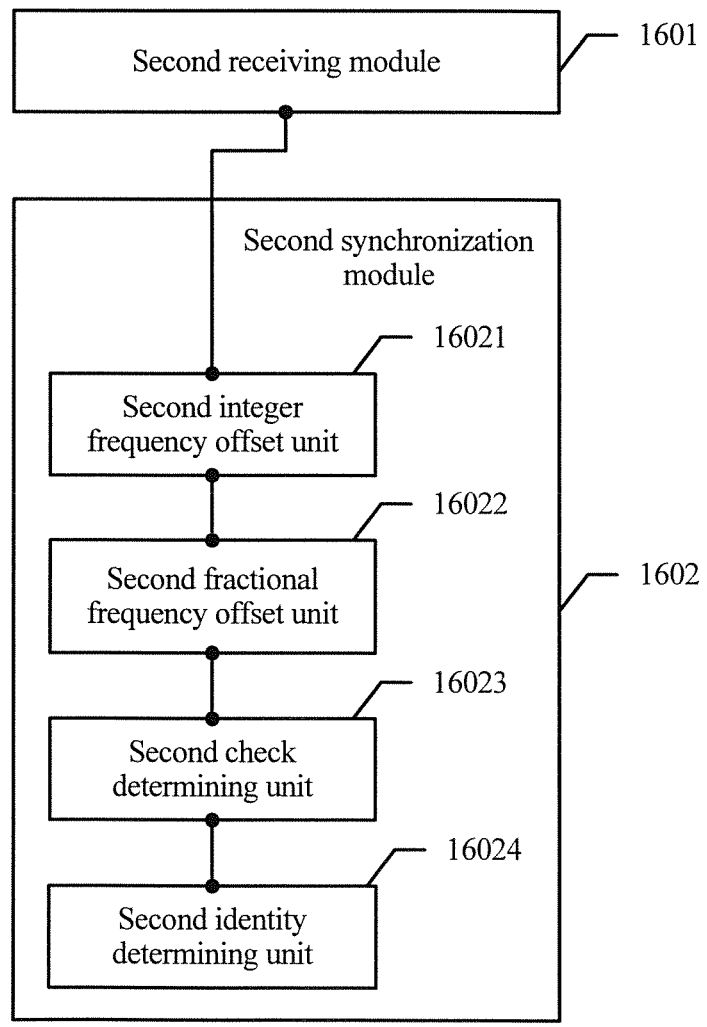
FIG. 16 is a structural diagram of another embodiment of a receive end device according to an embodiment of the present disclosure.

Generally, that the receive end device performs synchronization on the second signal mainly includes determining an integer frequency offset and a fractional frequency offset of the second signal. The following embodiment provides a relatively detailed description about a receive end device that can determine an integer frequency offset and a fractional frequency offset. Referring to FIG. 16, a basic structure of the receive end device includes a second receiving module 1601 and a second synchronization module 1602.

The second receiving module 1601 is configured to receive a second signal sent by a transmit end device. The receive end device receives the second signal sent by the transmit end device.

The second signal sent by the transmit end device includes a second synchronization sequence. Therefore, correspondingly, the second signal includes the second synchronization sequence, the second synchronization sequence is a sequence obtained after a special ZC sequence is cyclically shifted by a second quantity of digits, the special ZC sequence is a ZC sequence with a root index being +1 or −1, the receive end device operates in a serving cell, and the second quantity of digits is corresponding to a cell identity of the serving cell. It may be understood that, compared with the second synchronization sequence in the second signal, the second synchronization sequence in the second signal received by the receive end device has a frequency offset value.

The second synchronization module 1602 is configured to perform synchronization on the second signal. In this embodiment, the second synchronization module 1602 specifically includes a second integer frequency offset unit 16021 and a second fractional frequency offset unit 16022.

The second integer frequency offset unit 16021 is configured to determine an integer frequency offset of the second signal. There are many methods for determining the integer frequency offset of the second signal by the second integer frequency offset unit 16021. An example is as follows:

The second integer frequency offset unit 16021 determines at least one second check ZC sequence. The second check ZC sequence comes from a cyclically shifted special ZC sequence that may be used by all cells in the communications system, and the second check ZC sequence is a sequence obtained after the special ZC sequence is cyclically shifted by a second quantity of check digits.

For each second check ZC sequence, the second integer frequency offset unit 16021 executes the following operations: performing frequency compensation on the second synchronization sequence by using at least one frequency value, to obtain a second compensation sequence corresponding to each frequency value; performing sliding correlation on each second compensation sequence by using the second check ZC sequence, to obtain a sliding correlation peak corresponding to each second compensation sequence; and determining a maximum sliding correlation peak of the sliding correlation peak corresponding to each second compensation sequence as a check peak corresponding to the second check ZC sequence. Each frequency value used by the second integer frequency offset unit 16021 is an integer multiple of signal bandwidth of the second signal. Generally, the second synchronization sequence has a maximum frequency offset value. In this case, an absolute value of each frequency value used by the receive end device is not greater than the maximum frequency offset value. A value of a frequency offset value may be 0.

The second integer frequency offset unit 16021 determines a maximum check peak of the check peak corresponding to each second check ZC sequence as a second maximum correlation peak.

The second integer frequency offset unit 16021 determines an opposite number of a frequency value corresponding to the second maximum correlation peak as the integer frequency offset of the second signal.

The second fractional frequency offset unit 16022 is configured to determine a fractional frequency offset of the second signal. There are many methods for determining the fractional frequency offset of the second signal by the second fractional frequency offset unit 16022. An example is as follows:

The second fractional frequency offset unit 16022 determines a second offset of the second maximum correlation peak relative to a starting location of the second synchronization sequence, and calculates the fractional frequency offset of the second signal according to the second offset.

Specifically, the fractional frequency offset b2 of the second signal may be obtained through calculation by using the following formula:

$$b2 = u \times \text{offset}_2 \times B/L,$$

where u is a root index of the special ZC sequence corresponding to the first signal, and $\text{offset}_2$ is the second offset. When $\text{offset}_2$ is a positive value, it indicates that the second maximum correlation peak shifts right relative to the starting location of the second synchronization sequence, or when $\text{offset}_2$ is a negative value, it indicates that the second maximum correlation peak shifts left relative to the starting location of the second synchronization sequence. B is the signal bandwidth of the second signal, and L is a length of the second synchronization sequence.

Preferably, the second synchronization module 1602 may further include a second check determining unit 16023 and a second identity determining unit 16024.

The second check determining unit 16023 is configured to determine a second quantity of check digits corresponding to the second maximum correlation peak as the second quantity of digits.

The second synchronization sequence is a sequence obtained after the special ZC sequence is cyclically shifted by the second quantity of digits. Therefore, a maximum peak value can be obtained only by performing sliding correlation on the second synchronization sequence by using the sequence obtained after the special ZC sequence is cyclically shifted by the second quantity of digits. Therefore, the second check determining unit 16023 determines the second quantity of check digits corresponding to the second maximum correlation peak as the second quantity of digits.

The second identity determining unit 16024 is configured to determine the cell identity of the serving cell according to the second quantity of digits.

Because the second quantity of digits is corresponding to the cell identity of the serving cell, after the second quantity of digits is determined, the second identity determining unit 16024 may determine the cell identity of the serving cell according to a correspondence between the second quantity of digits and the cell identity. After determining the cell identity of the serving cell, the receive end device may use the cell identity of the serving cell in a subsequent signal processing process.

In this embodiment, a second receiving module 1601 receives a second signal sent by a transmit end device, a second integer frequency offset unit 16021 determines an integer frequency offset of the second signal, the second fractional frequency offset unit 16022 determines a fractional frequency offset of the second signal, and a second identity determining unit 16024 determines a cell identity of a serving cell. Because a second synchronization sequence included in the second signal received by the receive end device in this embodiment of the present disclosure is obtained after a special ZC sequence is cyclically shifted by a second quantity of digits, the receive end device may distinguish different cells by using different quantities of digits of cyclic shifts of a ZC sequence with a root index being +1 or −1, so that root indexes of ZC sequences in signals of the different cells received by the receive end device do not need to be different values, thereby implementing signal synchronization in an M2M technology by using the ZC sequence with a root index being +1 or −1.

Preferably, in some scenarios of actual application, for example, when the receive end device is a base station, the receive end device may directly learn the cell identity of the serving cell. In this way, the second check determining unit 16023 and the second identity determining unit 16024 may be omitted. In addition, because the second quantity of digits is corresponding to the cell identity of the serving cell, the receive end device may determine the second quantity of digits according to the cell identity of the serving cell and the correspondence between the second quantity of digits and the cell identity. After the receive end device determines the second quantity of digits according to the cell identity of the serving cell, the receive end device may directly use a special ZC sequence that is cyclically shifted by the second quantity of digits as the second check ZC sequence. In such a method, a quantity of second check ZC sequences determined by the receive end device can be reduced, thereby reducing performance consumption of the receive end device.

Figure 17:
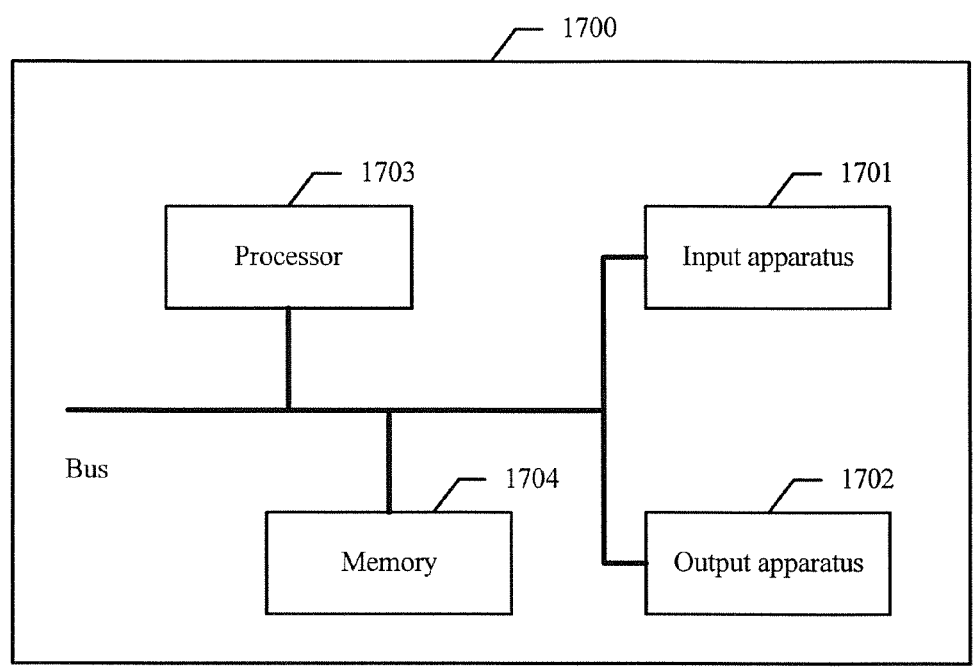
FIG. 17 is a structural diagram of another embodiment of a transmit end device or a receive end device according to an embodiment of the present disclosure.

The foregoing describes the transmit end device and the receive end device in the embodiments of the present disclosure from a perspective of a unitized functional entity, and the following describes a transmit end device and a receive end device in embodiments of the present disclosure from a perspective of hardware processing. First, description is provided from a perspective of a transmit end device. Referring to FIG. 17, another embodiment of a transmit end device in an embodiment of the present disclosure includes:

an input apparatus 1701, an output apparatus 1702, a processor 1703, and a memory 1704 (there may be one or more processors 1703 in a transmit end device 1700, and one processor 1703 is used as an example in FIG. 17). In some embodiments of the present disclosure, the input apparatus 1701, the output apparatus 1702, the processor 1703, and the memory 1704 may be connected by using a bus or in another manner, and a connection implemented by using a bus is used as an example in FIG. 17.

By invoking an operation instruction stored in the memory 1704, the processor 1703 is configured to perform the following steps: determining, by the transmit end device, a first signal, where the transmit end device operates in a serving cell, the first signal includes a first synchronization sequence, the first synchronization sequence is a sequence obtained after a special ZC sequence is cyclically shifted by a first quantity of digits and then dot multiplication or conjugate multiplication is performed on the cyclically shifted special ZC sequence and a characteristic sequence, the special ZC sequence is a ZC sequence with a root index being +1 or −1, the characteristic sequence and/or the first quantity of digits are/is corresponding to a cell identity of the serving cell, and the characteristic sequence is used to distinguish the serving cell from another cell; sending the first signal to a receive end device, so that the receive end device performs synchronization according to the first signal; determining the cell identity of the serving cell; determining the characteristic sequence and/or the first quantity of digits according to the cell identity of the serving cell; and determining the first signal according to the characteristic sequence and/or the first quantity of digits.

Alternatively, by invoking an operation instruction stored in the memory 1704, the processor 1703 is configured to perform the following steps: determining, by the transmit end device, a second signal, where the second signal includes a second synchronization sequence, the second synchronization sequence is a sequence obtained after a special ZC sequence is cyclically shifted by a second quantity of digits, the special ZC sequence is a ZC sequence with a root index being +1 or −1, the transmit end device operates in a serving cell, and the second quantity of digits is corresponding to a cell identity of the serving cell; sending the second signal to a receive end device, so that the receive end device performs synchronization according to the second signal; determining the cell identity of the serving cell; determining the second quantity of digits according to the cell identity of the serving cell; and determining the second signal according to the second quantity of digits.

Then, description is provided from a perspective of a receive end device. Still referring to FIG. 17, another embodiment of a receive end device in an embodiment of the present disclosure includes:

an input apparatus 1701, an output apparatus 1702, a processor 1703, and a memory 1704 (there may be one or more processors 1703 in a receive end device 1700, and one processor 1703 is used as an example in FIG. 17). In some embodiments of the present disclosure, the input apparatus 1701, the output apparatus 1702, the processor 1703, and the memory 1704 may be connected by using a bus or in another manner, and a connection implemented by using a bus is used as an example in FIG. 17.

By invoking an operation instruction stored in the memory 1704, the processor 1703 is configured to perform the following steps: receiving, by the receive end device, a first signal sent by a transmit end device, where the receive end device operates in a serving cell, the first signal includes a first synchronization sequence, the first synchronization sequence is a sequence obtained after a special ZC sequence is cyclically shifted by a first quantity of digits and then dot multiplication or conjugate multiplication is performed on the cyclically shifted special ZC sequence and the characteristic sequence, the special ZC sequence is a ZC sequence with a root index being +1 or −1, the characteristic sequence and/or the first quantity of digits are/is corresponding to a cell identity of the serving cell, and the characteristic sequence is used to distinguish the serving cell from another cell; performing synchronization on the first signal; determining an integer frequency offset of the first signal; determining a fractional frequency offset of the first signal; determining at least one check sequence group, where each check sequence group includes a check characteristic sequence and a first check ZC sequence, and the first check ZC sequence is a sequence obtained after the special ZC sequence is cyclically shifted by a first quantity of check digits; for each check sequence group, de-characterizing the first synchronization sequence by using the check characteristic sequence in the check sequence group, performing frequency compensation on the de-characterized first synchronization sequence by using at least one frequency value, to obtain a first compensation sequence corresponding to each frequency value, performing sliding correlation on each first compensation sequence by using the first check ZC sequence, to obtain a sliding correlation peak corresponding to each first compensation sequence, and determining a maximum sliding correlation peak of the sliding correlation peak corresponding to each first compensation sequence as a check peak corresponding to the check sequence group; determining a maximum check peak of the check peak corresponding to each check sequence group as a first maximum correlation peak; determining an opposite number of a frequency value corresponding to the first maximum correlation peak as the integer frequency offset of the first signal; determining a first offset of the first maximum correlation peak relative to a starting location of the first synchronization sequence, and determining the first offset as the fractional frequency offset of the first signal; determining a check characteristic sequence corresponding to the first maximum correlation peak as the characteristic sequence, and determining a first quantity of check digits corresponding to the first maximum correlation peak as the first quantity of digits; and determining the cell identity of the serving cell according to the characteristic sequence and/or the first quantity of digits.

Alternatively, by invoking an operation instruction stored in the memory 1704, the processor 1703 is configured to perform the following steps: receiving, by the receive end device, a second signal sent by a transmit end device, where the second signal includes a second synchronization sequence, the second synchronization sequence is a sequence obtained after a special ZC sequence is cyclically shifted by a second quantity of digits, the special ZC sequence is a ZC sequence with a root index being +1 or −1, the receive end device operates in a serving cell, and the second quantity of digits is corresponding to a cell identity of the serving cell; performing synchronization on the second signal; determining an integer frequency offset of the second signal; determining a fractional frequency offset of the second signal; determining at least one second check ZC sequence, where the second check ZC sequence is a sequence obtained after the special ZC sequence is cyclically shifted by a second quantity of check digits; for each second check ZC sequence, performing frequency compensation on the second synchronization sequence by using at least one frequency value, to obtain a second compensation sequence corresponding to each frequency value, performing sliding correlation on each second compensation sequence by using the second check ZC sequence, to obtain a sliding correlation peak corresponding to each second compensation sequence, and determining a maximum sliding correlation peak of the sliding correlation peak corresponding to each second compensation sequence as a check peak corresponding to the second check ZC sequence; determining a maximum check peak of the check peak corresponding to each second check ZC sequence as a second maximum correlation peak; determining a frequency value corresponding to the second maximum correlation peak as the integer frequency offset of the second signal; determining a second offset of the second maximum correlation peak relative to a starting location of the second synchronization sequence, and determining the second offset as the fractional frequency offset of the second signal; determining a second quantity of check digits corresponding to the second maximum correlation peak as the second quantity of digits; and determining the cell identity of the serving cell according to the second quantity of digits.

For ease of understanding the foregoing embodiments, description is provided below by using a specific application scenario of the foregoing embodiments as an example.

In a serving cell, a base station performs M2M communication with UE.

The base station determines a cell identity of the serving cell, and determines, according to the cell identity of the serving cell, that a characteristic sequence is a pseudo-random sequence using the cell identity of the serving cell as a seed; and determines that a first quantity of digits is 0. Because the first quantity of digits is 0, the base station directly performs dot multiplication on a ZC sequence with a root index of 1 and the pseudo-random sequence, to obtain a first synchronization sequence, and sends a first signal including the first synchronization sequence to the UE.

A signal received by a first receiving module 1401 of the UE is the first signal. Compared with the first signal, the signal received by the UE has a frequency offset, and the first signal includes the first synchronization sequence. A first integer frequency offset unit 14021 of the UE determines ten check sequence groups, where each check sequence group includes a pseudo-random sequence using different cell identities as seeds and the ZC sequence with a root index of 1.

For each check sequence group, the first integer frequency offset unit 14021 of the UE executes the following operations: performing conjugate multiplication on the first synchronization sequence and the pseudo-random sequence in the check sequence group; then, performing frequency compensation on a de-characterized first synchronization sequence by using at least one frequency value, to obtain a first compensation sequence corresponding to each frequency value; performing sliding correlation on each first compensation sequence by using the ZC sequence with a root index of 1, to obtain a sliding correlation peak corresponding to each first compensation sequence; and determining that a maximum sliding correlation peak of the sliding correlation peak corresponding to each first compensation sequence is a check peak corresponding to the check sequence group. Because there are ten check sequence groups in total, a total of ten check peaks may be obtained.

The first integer frequency offset unit 14021 of the UE determines a maximum check peak of the ten check peaks as a first maximum correlation peak, and determines a frequency value corresponding to the first maximum correlation peak as an integer frequency offset of the first signal, and a first fractional frequency offset unit 14022 determines a first offset of the first maximum correlation peak relative to a starting location of the first synchronization sequence as a fractional frequency offset of the first signal.

A first check determining unit 14023 of the UE determines a pseudo-random sequence in a check sequence group corresponding to the first maximum correlation peak, and a first identity determining unit 14024 determines a seed of the pseudo-random sequence as the cell identity of the serving cell.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A synchronization signal sending method, comprising:
    determining, by a transmit end device, a first signal, wherein the transmit end device operates in a serving cell, the first signal comprises a first synchronization sequence, the first synchronization sequence is a sequence obtained after a Zadoff-Chu (ZC) sequence is cyclically shifted by a first quantity of digits and then dot multiplication or conjugate multiplication is performed on the cyclically shifted ZC sequence and a characteristic sequence, the ZC sequence is a ZC sequence with a root index being +1 or −1, the characteristic sequence and/or the first quantity of digits are/is corresponding to a cell identity of the serving cell, and the characteristic sequence is used to distinguish the serving cell from another cell; and
    sending, by the transmit end device, the first signal to a receive end device, wherein the first signal is used for performing synchronization by the receive end device.

2. The synchronization signal sending method according to claim 1, wherein determining, by the transmit end device, the first signal comprises:
    determining, by the transmit end device, the cell identity of the serving cell;
    determining, by the transmit end device, the characteristic sequence and/or the first quantity of digits according to the cell identity of the serving cell; and
    determining, by the transmit end device, the first signal according to the characteristic sequence and/or the first quantity of digits.

3. The synchronization signal sending method according to claim 1, wherein the characteristic sequence comprises:
    a pseudo-random sequence, a Walsh sequence, a Hadamard sequence, a Gold sequence, or a ZC sequence.

4. A transmit end device, comprising:
    a processor;
    a non-transitory memory;
    wherein the non-transitory memory is configured to store an instruction and the processor is configured to execute the instruction stored in the non-transitory memory to:
        determine a first signal, wherein the transmit end device operates in a serving cell, the first signal comprises a first synchronization sequence, the first synchronization sequence is a sequence obtained after a Zadoff-Chu (ZC) sequence is cyclically shifted by a first quantity of digits and then dot multiplication or conjugate multiplication is performed on the cyclically shifted ZC sequence and a characteristic sequence, the ZC sequence is a ZC sequence with a root index being +1 or −1, the characteristic sequence and/or the first quantity of digits are/is corresponding to a cell identity of the serving cell, and the characteristic sequence is used to distinguish the serving cell from another cell; and
        send the first signal to a receive end device, wherein the first signal is used for performing synchronization by the receive end device.

5. The transmit end device according to claim 4, wherein the processor is further configured to:
    determine the cell identity of the serving cell;
    determine the characteristic sequence and/or the first quantity of digits according to the cell identity of the serving cell; and
    determine the first signal according to the characteristic sequence and/or the first quantity of digits.

6. A receive end device, comprising:
    a processor;
    a non-transitory memory;
    wherein the non-transitory memory is configured to store an instruction and the processor is configured to execute the instruction stored in the non-transitory memory to:
        receive a first signal sent by a transmit end device, wherein the receive end device operates in a serving cell, the first signal comprises a first synchronization sequence, the first synchronization sequence is a sequence obtained after a Zadoff-Chu (ZC) sequence is cyclically shifted by a first quantity of digits and then dot multiplication or conjugate multiplication is performed on the cyclically shifted ZC sequence and the characteristic sequence, the ZC sequence is a ZC sequence with a root index being +1 or −1, the characteristic sequence and/or the first quantity of digits are/is corresponding to a cell identity of the serving cell, and the characteristic sequence is used to distinguish the serving cell from another cell; and
    a first synchronization module, configured to perform synchronization according to the first signal.

7. The receive end device according to claim 6, wherein the processor is further configured to:
    determine an integer frequency offset of the first signal; and
    determine a fractional frequency offset of the first signal.

8. The receive end device according to claim 7, wherein the processor is further configured to:
    determine at least one check sequence group, wherein each check sequence group comprises a check characteristic sequence and a first check ZC sequence, and the first check ZC sequence is a sequence obtained after the ZC sequence is cyclically shifted by a first quantity of check digits;
    for each check sequence group:
        de-characterize the first synchronization sequence by using the check characteristic sequence in the check sequence group;
        perform frequency compensation on the de-characterized first synchronization sequence by using at least one frequency value, to obtain a first compensation sequence corresponding to each frequency value;
        perform sliding correlation on each first compensation sequence by using the first check ZC sequence, to obtain a sliding correlation peak corresponding to each first compensation sequence; and determine a maximum sliding correlation peak of the sliding correlation peaks corresponding to first compensation sequences as a check peak corresponding to the check sequence group;

determine a maximum check peak of the check peaks corresponding to check sequence groups as a first maximum correlation peak; and determine an opposite number of a frequency value corresponding to the first maximum correlation peak as the integer frequency offset of the first signal.

9. The receive end device according to claim 8, wherein the processor is further configured to:

determine a first offset of the first maximum correlation peak relative to a starting location of the first synchronization sequence, and calculate the fractional frequency offset of the first signal according to the first offset.

10. The receive end device according to claim 8, wherein the processor is further configured to:

determine a check characteristic sequence corresponding to the first maximum correlation peak as the characteristic sequence, and determine a first quantity of check digits corresponding to the first maximum correlation peak as the first quantity of digits; and determine the cell identity of the serving cell according to the characteristic sequence and/or the first quantity of digits.

* * * * *